(12) United States Patent
Greening et al.

(10) Patent No.: US 9,071,071 B2
(45) Date of Patent: *Jun. 30, 2015

(54) DIFFUSION-LIMITED ADAPTIVE BATTERY CHARGING

(71) Applicant: Apple Inc., Cupertino, CA (US)

(72) Inventors: Thomas C. Greening, San Jose, CA (US); P. Jeffrey Ungar, San Jose, CA (US); William C. Athas, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/202,918

(22) Filed: Mar. 10, 2014

(65) Prior Publication Data

US 2014/0197805 A1    Jul. 17, 2014

Related U.S. Application Data

(63) Continuation of application No. 12/242,641, filed on Sep. 30, 2008, now Pat. No. 8,754,611.

(60) Provisional application No. 61/044,160, filed on Apr. 11, 2008.

(51) Int. Cl.
*H02J 7/00* (2006.01)
*G01P 3/56* (2006.01)
(Continued)

(52) U.S. Cl.
CPC .. *H02J 7/007* (2013.01); *H02J 7/00* (2013.01); *G01P 3/56* (2013.01); *G01P 15/00* (2013.01);
(Continued)

(58) Field of Classification Search
CPC ............ G01P 3/56; G01P 15/00; H02J 7/007; H02J 7/002; H01M 10/0525; H01M 10/443

USPC ................ 320/112, 113, 134, 156, 146–147; 429/221, 231.3, 231.5, 61
See application file for complete search history.

(56) References Cited

U.S. PATENT DOCUMENTS 5,185,566 A * 2/1993 Goedken et al. ............... 320/113
5,625,291 A * 4/1997 Brink et al. .................... 324/427

(Continued)

FOREIGN PATENT DOCUMENTS

EP      1191622       3/2002
GB      2459039    *  3/2012

(Continued)

OTHER PUBLICATIONS

Dahmen, Edouard Albert Marie Fernand, "Electroanalysis: Theory and Applications in Aqueous and Non Aqueous media and in Automated Chemical Control", 1986, Elsevier, XP002543251, pp. 165-167.

(Continued)

*Primary Examiner* — Patrick Assouad
*Assistant Examiner* — Lamarr Brown
(74) *Attorney, Agent, or Firm* — Park, Vaughan, Fleming & Dowler LLP; A. Richard Park

(57) ABSTRACT

Some embodiments of the present invention provide a system that adaptively charges a battery, wherein the battery is a lithium-ion battery which includes a transport-limiting electrode governed by diffusion, an electrolyte separator and a non-transport-limiting electrode. During operation, the system determines a lithium surface concentration at an interface between the transport-limiting electrode and the electrolyte separator based on a diffusion time for lithium in the transport-limiting electrode. Next, the system calculates a charging current or a charging voltage for the battery based on the determined lithium surface concentration. Finally, the system applies the charging current or the charging voltage to the battery.

17 Claims, 16 Drawing Sheets

(51) Int. Cl.
*G01P 15/00* (2006.01)
*H01M 10/0525* (2010.01)
*H01M 10/44* (2006.01)
*H01M 10/48* (2006.01)
*H01M 2/00* (2006.01)

(52) U.S. Cl.
CPC .......... *H01M 10/0525* (2013.01); *H01M 10/44* (2013.01); *H01M 10/443* (2013.01); *H01M 10/48* (2013.01); *H02J 7/0072* (2013.01); *Y02E 60/122* (2013.01); *Y02T 10/7011* (2013.01); *H01M 2/00* (2013.01); *H01M 2300/00* (2013.01)

(56) References Cited

U.S. PATENT DOCUMENTS

| | | | | |
|---|---|---|---|---|
| 5,627,479 A * | 5/1997 | Viscor et al. | 324/719 |
| 5,726,554 A * | 3/1998 | Freiman et al. | 320/157 |
| 5,760,568 A * | 6/1998 | Naskali | 320/139 |
| 5,818,198 A * | 10/1998 | Mito et al. | 320/112 |
| 5,994,878 A * | 11/1999 | Ostergaard et al. | 320/132 |
| 6,040,685 A * | 3/2000 | Tsenter et al. | 320/160 |
| 6,094,033 A * | 7/2000 | Ding et al. | 320/132 |
| 6,137,265 A * | 10/2000 | Cummings et al. | 320/133 |
| 6,281,683 B1 * | 8/2001 | Podrazhansky et al. | 324/432 |
| 6,595,919 B2 * | 7/2003 | Berner et al. | 600/365 |
| 6,608,469 B2 * | 8/2003 | Fukuoka et al. | 320/134 |
| 6,818,352 B2 * | 11/2004 | Daido et al. | 429/231.95 |
| 6,858,348 B2 * | 2/2005 | Kitoh | 429/231.1 |
| 7,940,027 B2 * | 5/2011 | Desprez et al. | 320/134 |
| 7,981,755 B2 * | 7/2011 | Breitwisch et al. | 438/361 |
| 8,163,410 B2 * | 4/2012 | Fulop et al. | 429/61 |
| 8,206,469 B2 * | 6/2012 | Chiang et al. | 29/623.1 |
| 8,241,789 B2 * | 8/2012 | Chiang et al. | 429/221 |
| 8,541,122 B2 * | 9/2013 | Fulop et al. | 429/61 |
| 8,580,430 B2 * | 11/2013 | Chiang et al. | 429/209 |
| 8,624,560 B2 * | 1/2014 | Ungar et al. | 320/164 |
| 8,749,204 B2 * | 6/2014 | Majima et al. | 320/149 |
| 8,754,611 B2 * | 6/2014 | Greening et al. | 320/112 |
| 2002/0001745 A1 * | 1/2002 | Gartstein et al. | 429/61 |
| 2005/0237029 A1 * | 10/2005 | Takezawa et al. | 320/135 |
| 2006/0022676 A1 * | 2/2006 | Uesaka et al. | 324/429 |
| 2006/0068272 A1 * | 3/2006 | Takami et al. | 429/62 |
| 2006/0141352 A1 * | 6/2006 | Kato et al. | 429/144 |
| 2006/0267555 A1 * | 11/2006 | Cargonja et al. | 320/132 |
| 2007/0031732 A1 * | 2/2007 | Chiang et al. | 429/231.95 |
| 2008/0030169 A1 * | 2/2008 | Kamishima et al. | 320/134 |
| 2008/0054848 A1 * | 3/2008 | Yun et al. | 320/134 |
| 2009/0091296 A1 * | 4/2009 | Desprez et al. | 320/134 |
| 2009/0104510 A1 * | 4/2009 | Fulop et al. | 429/50 |
| 2009/0123813 A1 * | 5/2009 | Chiang et al. | 429/50 |
| 2009/0128097 A1 * | 5/2009 | Esnard | 320/137 |
| 2009/0259420 A1 * | 10/2009 | Greening et al. | 702/63 |
| 2009/0273320 A1 * | 11/2009 | Ungar et al. | 320/162 |
| 2010/0003603 A1 * | 1/2010 | Chiang et al. | 429/231.95 |
| 2010/0308770 A1 * | 12/2010 | Michalske et al. | 320/116 |
| 2011/0005065 A1 * | 1/2011 | Chiang et al. | 29/623.1 |
| 2011/0045346 A1 * | 2/2011 | Chiang et al. | 429/199 |
| 2011/0151324 A1 * | 6/2011 | Chiang et al. | 429/210 |
| 2011/0169454 A1 * | 7/2011 | Maruyama et al. | 320/118 |
| 2011/0187329 A1 * | 8/2011 | Majima et al. | 320/149 |
| 2012/0146453 A1 * | 6/2012 | Chiang et al. | 310/300 |
| 2012/0251896 A1 * | 10/2012 | Chiang et al. | 429/338 |
| 2012/0263986 A1 * | 10/2012 | Fulop et al. | 429/91 |

FOREIGN PATENT DOCUMENTS

| | | | |
|---|---|---|---|
| WO | 2007004098 | | 1/2007 |
| WO | WO2007004098 | * | 1/2007 |
| WO | 2008026525 A1 | | 6/2008 |
| WO | WO2009126734 | * | 3/2009 |
| WO | 2009126734 | | 10/2009 |
| WO | 20090126797 | | 10/2009 |
| WO | WO2009126797 | * | 10/2009 |

OTHER PUBLICATIONS

Tsenter, B. et al., "Lithium-ion Battery Software Safety Protection", Aerospace and Electronic Systems Magazine, IEEE, vol. 13, No. 9, Sep. 1998, pp. 23-25, XP002543250.

* cited by examiner

DIFFUSION-LIMITED ADAPTIVE BATTERY CHARGING

RELATED APPLICATIONS

This application is a continuation application of, and hereby claims priority under 35 U.S.C. §120 to, pending U.S. patent application Ser. No. 12/242,641, entitled "Diffusion-Limited Adaptive Battery Charging," by inventors Thomas C. Greening, P. Jeffrey Ungar and William C. Athas, filed on 30 Sep. 2008. U.S. Ser. No. 12/242,641 claims priority under 35 U.S.C. §119 to U.S. Provisional Patent Application No. 61/044,160 filed 11 Apr. 2008, entitled "Diffusion-Limited Adaptive Charging," by inventors Thomas C. Greening, P. Jeffrey Ungar and William C. Athas.

BACKGROUND

1. Field

The present invention generally relates to techniques for charging a battery. More specifically, the present invention relates to a method and apparatus for charging a lithium-ion battery which adaptively controls the lithium surface concentration to remain within set limits.

2. Related Art

Rechargeable lithium-ion batteries are presently used to provide power in a wide variety of systems, including laptop computers, cordless power tools and electric vehicles. FIG. 1 illustrates a typical lithium-ion battery cell, which includes a porous graphite electrode, a polymer separator impregnated with electrolyte, and a porous cobalt dioxide electrode. The details of the transport of lithium and lithium ions in and out of the electrode granules and through the material between them are complex, but the net effect is dominated by slow diffusion processes for filling one electrode with lithium while removing it from the other.

Note that FIG. 1 provides a physical model for the layout of a typical lithium-ion cell, wherein the oxidation and reduction processes that occur during charging are also illustrated. The physical model shows the current collectors, which are in turn connected to the battery terminals; the polymer separator; and the positive and negative porous electrodes. Note that an electrolyte permeates the porous electrodes and the separator.

The negative electrode includes granules of graphite held together with a conductive binder (in practice, there may also be a nonconductive binder). Surrounding each graphite particle is a thin passivating layer called the solid-electrolyte interphase (SEI) that forms when a fresh cell is charged for the first time from the lithium atoms in the graphite reacting directly with the electrolyte. This occurs because the tendency for the lithium atoms to remain in the graphite is relatively weak when the cell is fully charged, but after the SEI is formed, the SEI acts as a barrier against further reactions with the electrolyte. Nevertheless, the SEI still allows transport of lithium ions, albeit with some degree of extra resistance.

The positive electrode includes granules of lithiated cobalt dioxide held together with binders similar to the negative electrode. Any SEI-like layer surrounding these particles is likely to be of much less significance than in the negative electrode because lithium atoms strongly favor remaining in these particles rather than leaving and reacting directly with the electrolyte.

Lithium transport in the negative graphite electrode (also referred to as the "transport-limiting electrode") is slower than in the positive cobalt dioxide electrode (also referred to as the "non-transport-limiting electrode"), and therefore limits the maximal speed of charging. During charging, the slow diffusion causes a transient build-up of lithium on the surfaces of the graphite that varies in direct proportion to the charging current and a characteristic diffusion time.

The diffusion time is typically on the order of hours and has a strong dependence on temperature and other variables. For instance, a cell at 15° C. can have a diffusion time which is ten times slower than a cell at 35° C. The diffusion time can also vary significantly between cells, even under the same environmental conditions, due to manufacturing variability.

If the concentration of lithium at the surface reaches the saturation concentration for lithium in graphite, more lithium is prevented from entering the graphite electrode until the concentration decreases. A primary goal of conventional battery-charging techniques is to avoid lithium surface saturation, while keeping the charging time to a minimum. For example, one conventional technique charges at a constant current until a fixed upper voltage limit (e.g., 4.2 V) is reached, and then charges by holding the voltage constant at this upper limit until the current tapers to some lower limit. Note that it is common practice to express all currents in terms of the cell capacity. For example, for a cell with a capacity of Qmax=2500 mA·hr, a "1 C" current would be 2500 mA. In these units, the constant current charging is usually done at less than 1 C (e.g., 0.3 C), and the constant voltage phase is terminated when the current tapers to some value less than 0.05 C.

FIG. 2 illustrates a representative conventional charging profile. The problem with a conventional charging scheme is that it largely operates blindly; the only information used is the cell voltage, which does not directly correlate to the lithium surface concentration. Consequently, conventional charging both misses the opportunity to use more current when it is possible to do so, and enters the saturation region if lithium transport is slower than expected.

Hence, what is needed is a method and an apparatus for charging a lithium-ion battery that does not suffer from the drawbacks of these existing techniques.

SUMMARY

Some embodiments of the present invention provide a system that adaptively charges a battery, wherein the battery is a lithium-ion battery which includes a transport-limiting electrode, an electrolyte separator and a non-transport-limiting electrode. To charge the battery, the system first determines a lithium surface concentration at an interface between the transport-limiting electrode and the electrolyte separator. Next, the system uses the determined lithium surface concentration to control a charging process for the battery so that the charging process maintains the lithium surface concentration within set limits.

In some embodiments, determining the lithium surface concentration involves determining a potential of the transport-limiting electrode with respect to a known reference, wherein the potential is correlated with the lithium surface concentration. In these embodiments, using the determined lithium surface concentration to control the charging process involves using the determined potential of the transport-limiting electrode in a control loop, which adjusts either a charging voltage or a charging current, to maintain the potential of the transport-limiting electrode at a level which keeps the lithium surface concentration within the set limits.

In some embodiments, maintaining the potential of the transport-limiting electrode involves maintaining a minimum potential or a maximum potential which keeps the lithium surface concentration within the set limits. For example, for a negative electrode, the lithium surface concentration can be maintained below a saturation level, whereas for a positive electrode, the lithium surface concentration can be maintained above a depletion value. (Note that the term "set limits" as used in this specification and the appended claims refers to one or more set limits.)

In some embodiments, determining the potential of the transport-limiting electrode involves directly measuring the potential of the transport-limiting electrode.

In some embodiments, determining the potential of the transport-limiting electrode involves: determining a state of charge for the battery; and determining the potential of the transport-limiting electrode from the determined state of charge and other parameters related to the battery.

In some embodiments, determining the potential of the transport-limiting electrode involves: monitoring a temperature of the battery; monitoring a current through the battery; monitoring a total cell voltage of the battery; and determining the potential of the transport-limiting electrode based on the monitored temperature, current and total cell voltage.

In some embodiments, the transport-limiting electrode is a negative electrode, and the non-transport-limiting electrode is a positive electrode.

In some embodiments, the negative electrode is comprised of graphite and/or $TiS_2$; the electrolyte separator is a liquid electrolyte comprised of $LiPF_6$, $LiBF_4$ and/or $LiClO_4$ and an organic solvent; and the positive electrode is comprised of $LiCoO_2$, $LiMnO_2$, $LiFePO_4$ and/or $Li_2FePO_4F$.

In some embodiments, determining the lithium surface concentration involves: measuring a diffusion time $\tau$ for lithium in the transport-limiting electrode; and estimating the lithium surface concentration between $\tau$ measurements based on the diffusion time $\tau$, a cell capacity $Q_{max}$ for the battery and a measured charging current I for the battery.

In some embodiments, measuring the diffusion time $\tau$ involves periodically performing a sequence of operations, including: (1) charging the battery with a fixed current for a fixed time period; (2) entering a zero current state in which the charging current is set to zero; (3) during the zero current state, measuring an open circuit voltage for the battery at two times while the open circuit voltage relaxes toward a steady state; and (4) calculating the diffusion time $\tau$ based on the measured open circuit voltages.

Some embodiments of the present invention provide a system that adaptively charges a battery, wherein the battery is a lithium-ion battery which includes a transport-limiting electrode, an electrolyte separator and a non-transport-limiting electrode. To charge the battery, the system monitors a current through the battery, a voltage of the battery, and a temperature of the battery. The system then uses the monitored current, voltage and temperature to control a charging process for the battery so that the charging process maintains a lithium surface concentration at an interface between the transport-limiting electrode and the electrolyte separator within set limits.

One embodiment of the present invention provides a battery with an adaptive charging mechanism. This battery includes a transport-limiting electrode, an electrolyte separator, and a non-transport-limiting electrode. It also includes a current sensor to measure a charging current for the battery, and a voltage sensor to measure a voltage across terminals of the battery. The battery additionally includes a charging source configured to apply a charging current or a charging voltage to the battery. This charging source operates under control of a controller, which receives inputs from the current sensor and the voltage sensor and sends a control signal to the charging source. During the charging process, the controller controls the charging source to maintain a lithium surface concentration at an interface between the transport-limiting electrode and the electrolyte separator within set limits.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Adaptive Surface Concentration Charging

Figure 1:
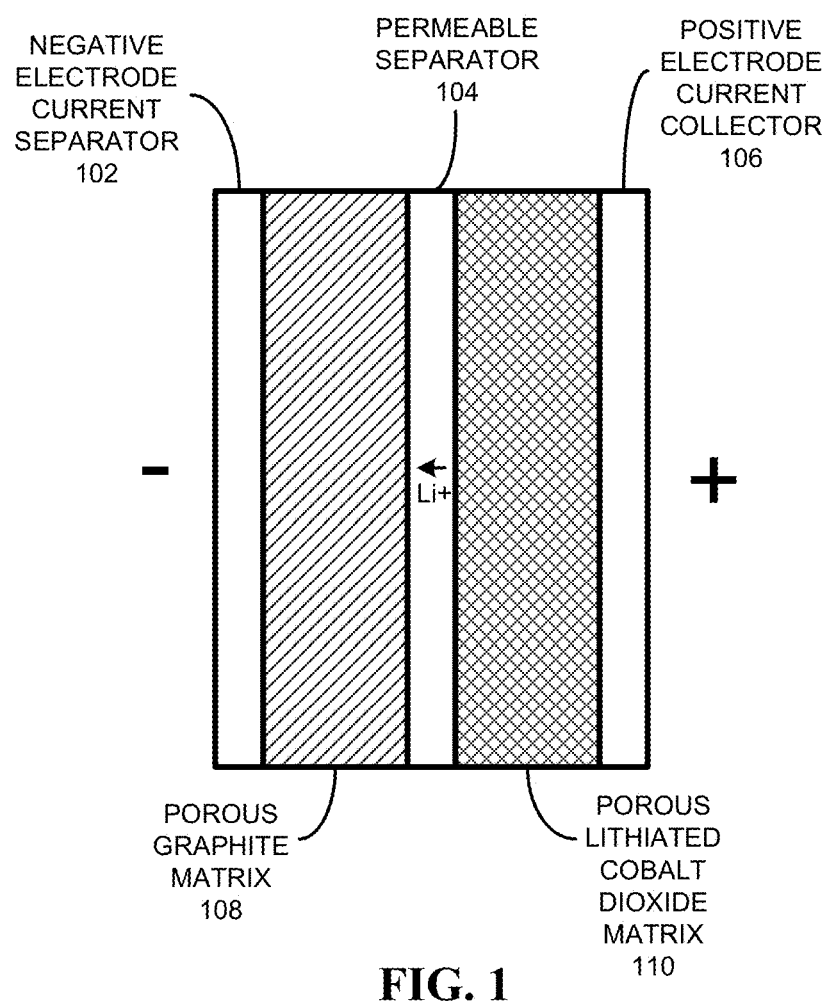
FIG. 1 illustrates a lithium-ion battery in accordance with an embodiment of the present invention.
Figure 2:
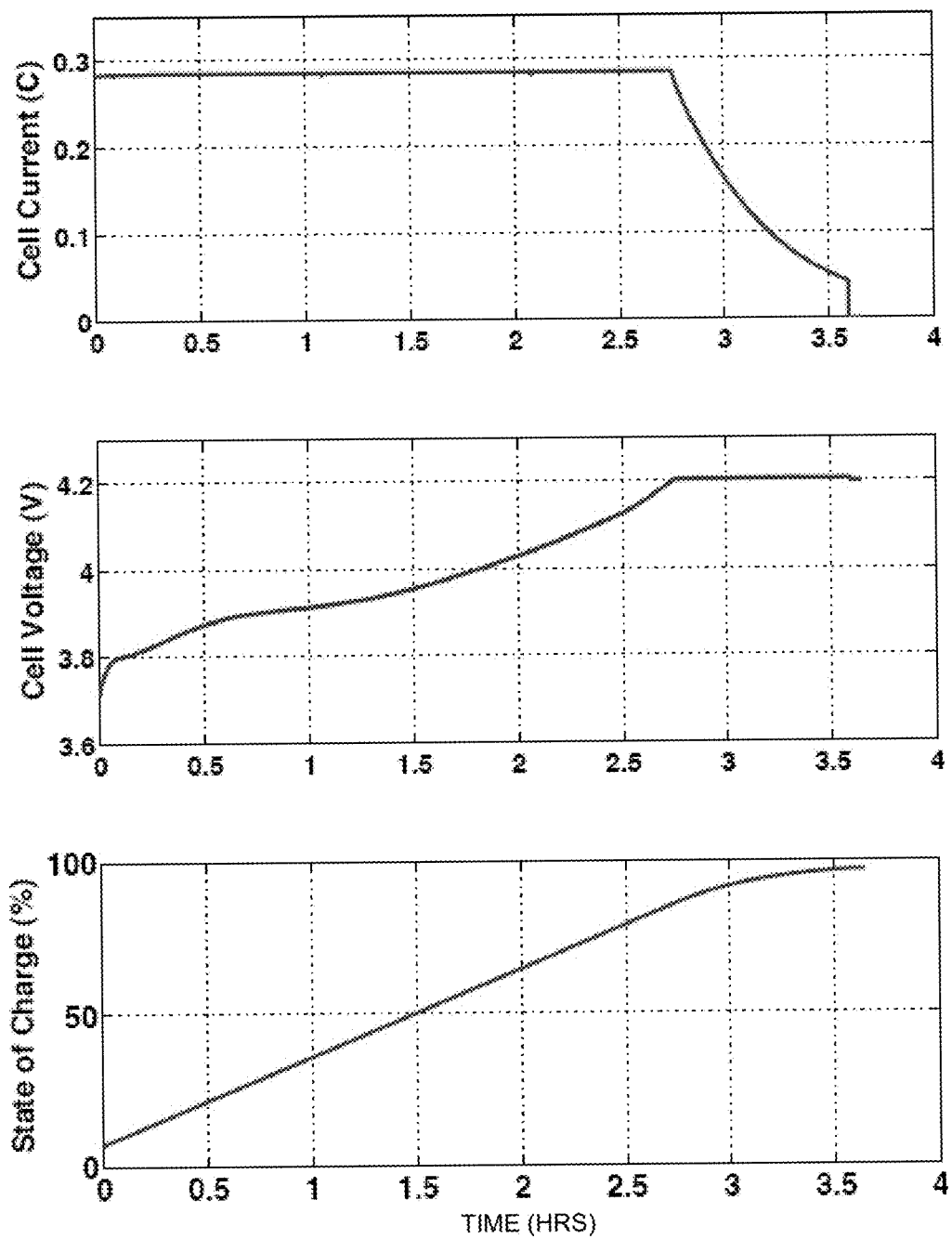
FIG. 2 illustrates a conventional charging profile for a lithium-ion battery.
Figure 3:
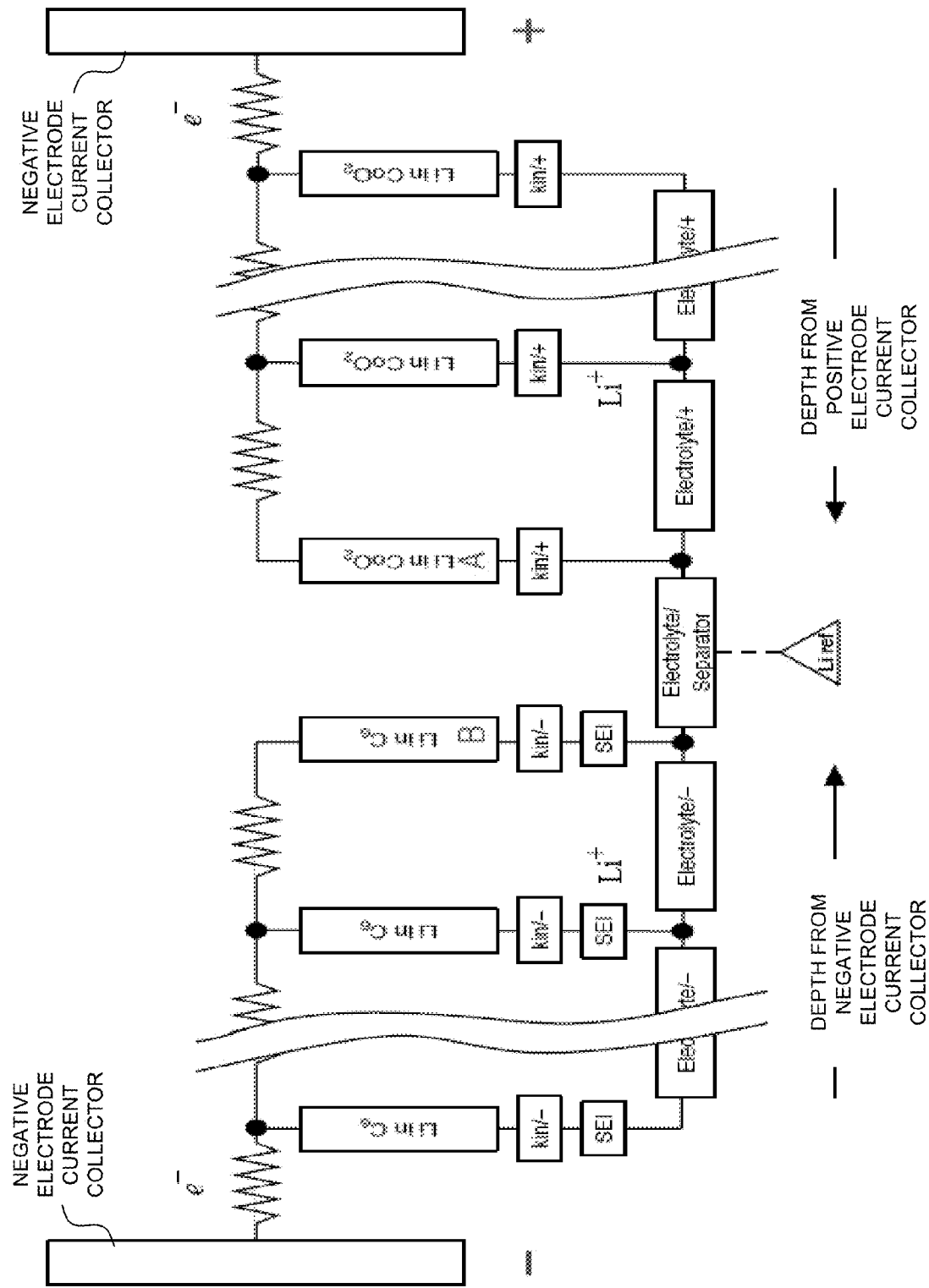
FIG. 3 illustrates a lumped representation of a lithium-ion cell.

FIG. 3 shows a lumped element model of a cell corresponding to the physical model shown earlier in FIG. 1. The model has a discrete element for the electrolyte permeating the separator and different elements for the electrolyte permeating the two porous electrodes. The electrolyte transport properties are different in these three regions, and generally transport of ions is expected to be fast through the separator and slower in the porous media. The graphite and cobalt dioxide lithium "insertion" materials are also represented by sets of discrete elements at various depths into their respective electrodes. They are electrically connected to the current collectors through successively greater series resistance to conduction through the binders and the insertion materials themselves.

Lithium transport in the graphite and cobalt dioxide grains is through diffusion, although there can be additional rate effects resulting from the growth of stoichiometric phases, like $LiC_{12}$. The lumped model also shows an element for the SEI layer in series with each graphite element since it impedes the flow of lithium ions significantly, but still allows the charge transfer reactions to occur. Finally, the kin/±elements account for the kinetics of the redox reactions occurring at the electrode-electrolyte interfaces. If these reactions are driven with currents near or exceeding their natural rates, a significant overpotential that opposes the flow may develop.

The relaxed, open circuit voltage (relaxed OCV) across the cell depends only on the steady-state electrochemical reactions occurring at the two electrodes. Because no net current flows, there are no nonzero potential differences across any of the electrolyte, SEI, kinetic, or resistive elements in FIG. 3. Furthermore, the concentration of lithium is uniform within each of the electrode insertion materials, and the concentration of Li+ ions is uniform throughout the electrolyte. Charging or discharging the cell results in a net reversible transfer of lithium from the cobalt dioxide in the positive electrode to the graphite in the negative electrode or vice versa, respectively. Therefore, a cell's relaxed OCV depends only on its state of charge, and, to a small extent, on temperature.

The electrochemical processes at the negative and positive electrodes can be described in terms of the respective half-cell reactions

$$Li_xC_6 \rightarrow Li_{x-y}C_6 + yLi^+ + ye^- \qquad (1)$$

and

$$LiCoO_2 \rightarrow Li_{1-y}CoO_2 + yLi^+ + ye^- \qquad (2)$$

The relaxed OCV is the electrochemical potential for the full cell; that is, $\epsilon = \epsilon_+ - \epsilon_-$, where $\epsilon_+$ and $\epsilon_-$ are the electrochemical potentials for the two half-cell reactions. It is convenient to use a metallic lithium electrode in the same electrolyte as the zero of potential; that is, to use the process

$$Li \rightarrow Li^+ + e^- \qquad (3)$$

as a reference for the working electrode potentials. In the field, this is commonly specified by referring to the potentials "vs. Li/Li+".

In practice, such a reference is incorporated into a cell built specifically for testing. The reference must be in contact with the electrolyte between the working electrodes, but insulated from direct contact with them, as shown schematically by the triangular element at the bottom of FIG. 3.

Figure 4:
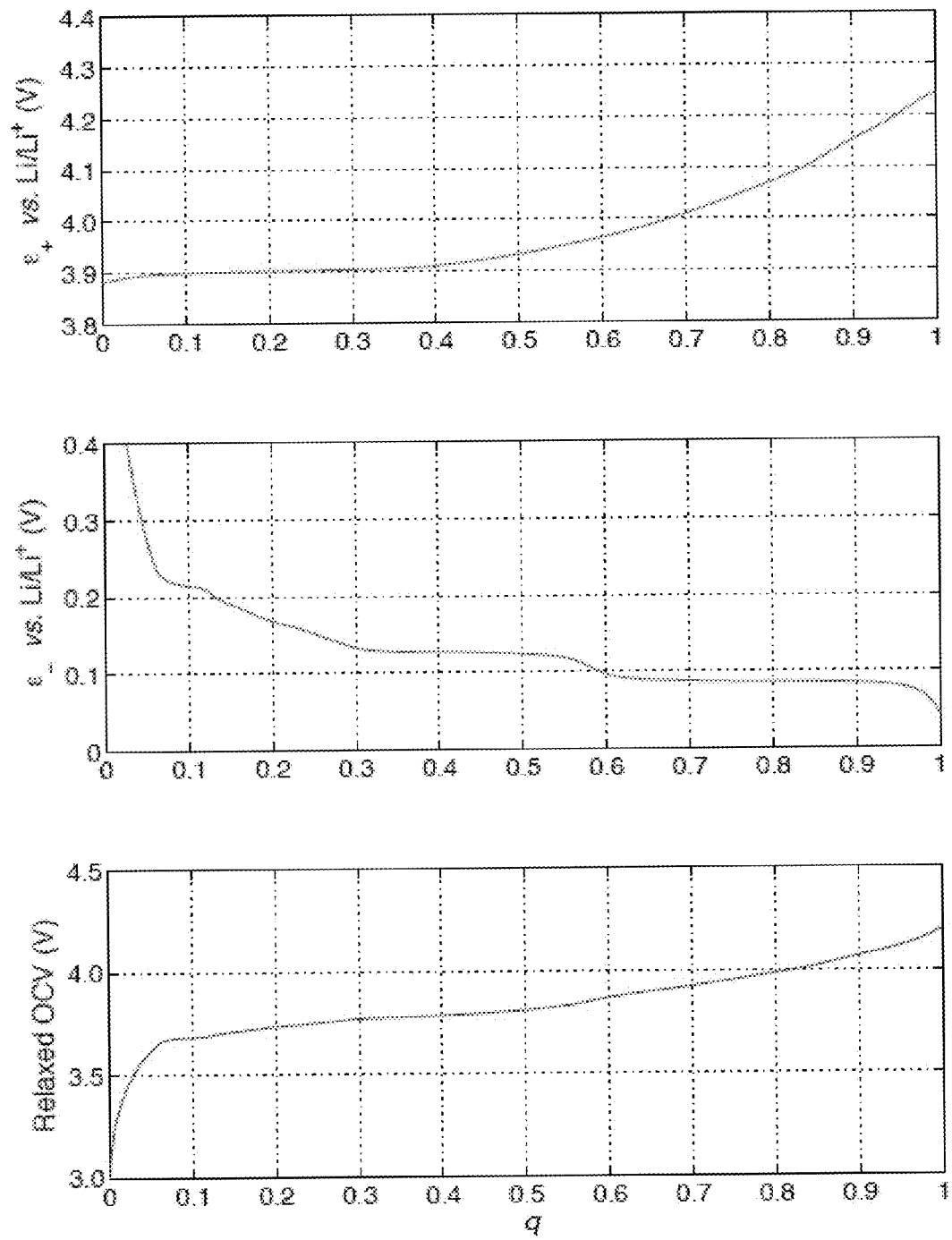
FIG. 4 illustrates a relaxed open-circuit voltage versus state of charge for a lithium-ion cell.

FIG. 4 shows typical single electrode potentials vs. Li/Li+ as a function of the cell's state of charge as measured using an incorporated metallic lithium reference electrode. The difference gives the full cell relaxed OCV curve, which is also shown. The potential for the negative electrode is of particular importance, since it is a fairly low value through much of the range and begins a steep decline toward zero at the top of charge. A negative electrode potential of 0V vs. Li/Li+ means the lithium in the graphite is in equilibrium with metallic lithium in the electrolyte; that is, the graphite is saturated with lithium.

A rough extrapolation of the plots in FIG. 4 shows that this cell would likely saturate the graphite at a relaxed OCV near 4.24 V, which is a modest margin of safety with respect to charging the cell to 4.20 V. For a given cell formulation, this margin is mostly affected by the balance in total electrode capacities. For example, using a thicker layer of graphite will stretch out the negative electrode potential curve relative to the one for the positive electrode. Therefore, at the top of charge (OCV of 4.20 V), the potentials for both electrodes will be greater. This is desirable for the negative electrode; the increased potential on the positive electrode may also be acceptable.

Thus far, we have only considered the static properties of the cell but charging (and discharging) involves a net current flow, so some of the transport dynamics captured by the model in FIG. 3 come into play. If, as is usually the case for this type of cell, the kinetics of the electrochemical reactions are fast, and the other sources of internal impedance are small, the dominant contribution to the cell voltage is still the difference between the electrochemical potentials for the two electrodes. However, instead of referencing them to an overall state of charge for the cell, one must use an effective state of charge for each electrode that corresponds to the surface concentration of lithium in the electrode's solid phase nearest the cell separator. Referring to FIG. 3, this is the potential difference between A and B, where we assume the voltage drops across the resistive elements, the kin/±elements, the SEI, and the electrolyte/separator element are small. There are a few subtleties here that merit further discussion.

First, the reason is that the lithium surface concentration in the solid is relevant is because the redox reactions all take place in the narrow region near the solid electrolyte interface. For example, for the negative electrode, the local electrochemical contribution to the potential comes from the process in Equation 1, where there is charge transfer resulting in lithium leaving the solid near the surface as lithium ions in the local electrolyte. The potential for this process is shown in the middle plot in FIG. 4, where the reference is now taken, in principle, to be lithium metal in electrolyte at the local concentration. The same applies to the local contribution to the potential from the process in Equation 2 for the positive electrode. Whether or not the surface concentration of lithium in the solid is much different from its value in the bulk depends on the current density at the interfaces and on the rate of solid state diffusion of lithium in the granules, but this results in no additional contribution to the cell voltage.

Second, the regions of the electrodes nearest the separator are of special importance because this is where the largest deviations from equilibrium lithium concentration occur and where the contribution to the cell voltage from electrolyte transport effects is smallest. The impedance of the electrolyte/±elements is expected to be significantly larger than for the electrolyte in the separator since the ions must travel through the tortuous paths formed by the pore spaces. Consequently, these will incur significant voltage drops, which in turn means that the local current densities and the deviations of the electrochemical potentials from equilibrium decrease with increasing distance from the separator. To put it another way, the net potential throughout either composite, porous electrode with respect to the lithium reference shown in FIG. 3 is constant and equal to its value nearest the separator, but an increasing share of it is attributable to the electrolyte in the pores.

When charging the cell, lithium will tend to pile up near the surfaces of the graphite granules and to deplete near the surfaces of the cobalt dioxide granules. Both electrodes will appear to be at higher states of charge than when equilibrated. However, they will not necessarily appear to be at the same higher state of charge; the electrode with the slower transport, here the negative electrode, will exhibit the larger difference.

The primary goal of an efficient adaptive charging technique is to charge at a rate where the lithium surface concentrations, and hence the electrode potentials, are kept within desirable limits, but as close to them as can be managed reliably. For example, with the negative electrode being the limiting factor, keeping its potential too far from 0V vs. Li/Li$^+$ charges unnecessarily slowly, but getting too close invites lithium saturation in the graphite. In principle, meeting this goal would be very simple for a cell with a reference electrode, since one could simply adjust the charger to servo the negative electrode potential to some positive value that gives a margin for error, such as 50 mV vs. Li/Li$^+$. This is the essence of the new Adaptive Surface Concentration Charging (ASCC) method.

There would, in fact, be more margin than the 50 mV because, even using a reference electrode, we see from FIG. 3 there will be a number of other voltage drops that will reduce the measured negative electrode potential, and some of these have nothing to do with its tendency to saturate. (This will be discussed in more detail in the next section.)

Without an integrated reference electrode, we can implement ASCC indirectly if we can track the cell's state of charge with sufficient accuracy. Let us assume the state of charge of the cell is q and we wish to target a voltage for the negative electrode of $v_{target}$. Referring to FIG. 4, and following the arguments already presented, we see that the voltage on the negative electrode vs. Li/Li$^+$ will satisfy $$vC6 \geq \epsilon_+(q) - v_{cell} \quad (4)$$

If the positive electrode transport limitations and resistive drops were eliminated, this lower bound would become an equality and exactly the same as what would be measured using a reference electrode. We will safely approach the target if $$\epsilon_+(q) - v_{cell} \geq v_{target} \quad (5)$$

or equivalently $$v_{cell} \leq \epsilon_+(q) - v_{target}$$

The one issue that can arise is that the estimate can be too conservative. In particular, any series resistance will increase the measured $v_{cell}$ and needlessly reduce the lower bound for the negative electrode voltage in Equation 4. Addressing these drops is the topic of the next section.

Resistive Potential Correction

Referring once again to FIG. 3, if we follow the path through the resistive elements, the separator, and the electrode elements closest to the separator, we can express the voltage across the cell at a state of charge q as $$v_{cell} = \epsilon_+(q+\Delta q_+) - \epsilon_-(q+\Delta q_-) + v_{kin/+} + v_{kin/-} + v_{SEI} + v_{separator} + v_r \quad (6)$$

The lithium surface concentrations for the positive and negative electrodes have been expressed relative to the base state of charge via the respective deviations $\Delta q \pm$. The $v_r$ drop is the total for the path through the resistive elements, and the other terms correspond to the individual elements in the diagram for the SEI and the reaction kinetics. The graphite-related voltage to manage while charging is $$v_{C6} \geq \epsilon_-(q+\Delta q_-) - v_{kin/-} - v_{SEI} \quad (7)$$

since if this reaches zero, the graphite will saturate at the surface and SEI growth may occur. If there are no limitations for the positive electrode, then all other impedance effects may be safely removed to estimate this voltage. Equations 6 and 7 give $$v_{C6} = \epsilon_+(q+\Delta q_+) + v_{kin/+} + v_{separator} + v_r - v_{cell}. \quad (8)$$

Assuming transport through the positive electrode is fast, we can neglect $\Delta q_+$ and $v_{kin/+}$, and an improved lower bound for the negative electrode voltage is $$v_{C6} \geq \epsilon_+(q) - (v_{cell} - v_{separator} - v_r). \quad (9)$$

If we can estimate the potential drop attributed here to the separator and electronic conduction through the solids, then we can account for them in an implementation of ASCC to reduce further the time to charge the cell. An examination of the cell's electrical characteristics provides just such an estimate, which we now discuss.

Electrochemical Impedance Spectroscopy (EIS) is the measurement of the small signal, differential impedance of a cell as a function of frequency. In concept, and in one common measurement configuration, a cell under test is brought to a known state of charge, and a small sinusoidal voltage of fixed frequency is applied in superposition with the relaxed OCV. The resulting current is measured after any transient behavior has decayed, and is compared in magnitude and phase with the applied voltage to give the complex impedance for this frequency. A plot of the real and imaginary parts of the impedance as the frequency is swept from low to high can reveal much about transport throughout the cell and interfacial processes at the electrodes.

Figure 5:
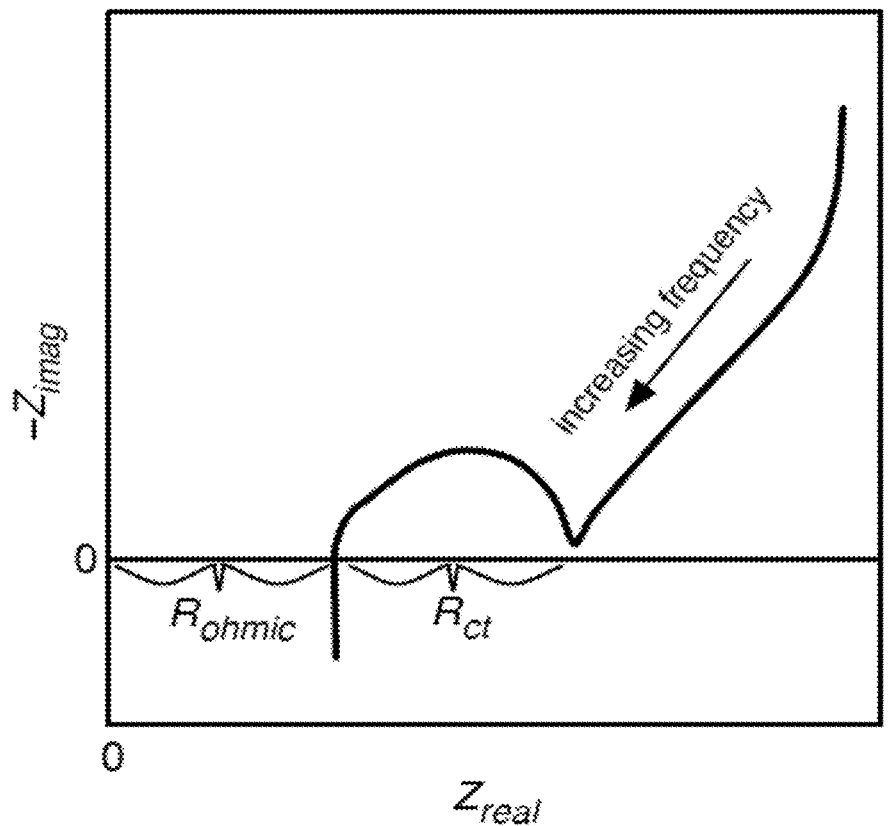
FIG. 5 provides a schematic representation of a Cole-Cole impedance plot for a typical lithium-ion cell.

FIG. 5 is a schematic representation of an impedance spectrum for a typical lithium-ion cell, also known as a Cole-Cole impedance plot. The different features in the plot correspond to different processes in the cell. For example, the 45° straight section at low frequencies is characteristic of a diffusive process, such as for transport of ions through the electrolyte in the porous electrodes, or of lithium into the solids, and the turn up the $-Z_{imag}$ axis at the lowest frequencies corresponds to the cell charging and discharging. The nearly semicircular hump at higher frequencies is more interesting, since it likely corresponds to the charge transfer process across the SEI film in the negative electrode. This feature can be described roughly by a parallel RC circuit, with resistance $R_{ct}$, as shown on the plot.

Figure 6:
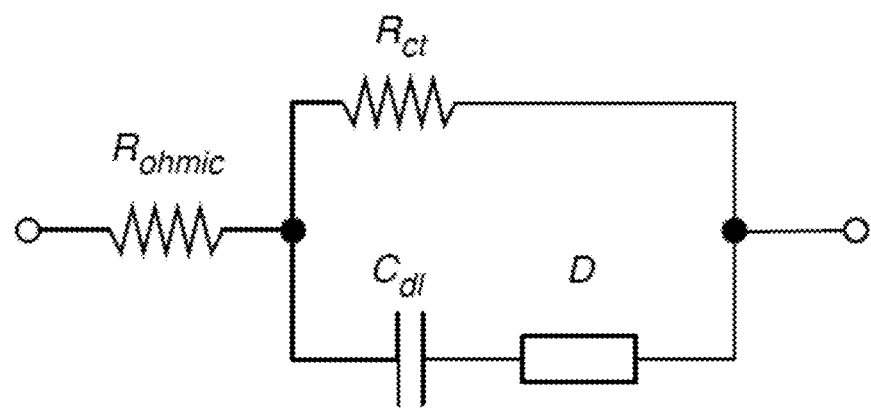
FIG. 6 illustrates an equivalent circuit which captures most of the features in the impedance plot in FIG. 5.

At higher frequencies still, we see the suggestion of another feature distorting the semicircle, and finally the impedance turns sharply down the $-Z_{imag}$ axis, which is inductive behavior. There is a significant residual resistive component, $R_{ohmic}$, and this is what we can use to provide the improved negative electrode voltage estimate suggested by Equation 9. One possible equivalent circuit that captures most of the impedance plot features is shown in FIG. 6. The charge transfer through the SEI is represented by $R_{ct}$ and a double-layer capacitance $C_{dl}$ for the charging of the interface. The D element represents diffusive transport in the porous electrode. $R_{ohmic}$ is in series with the electrode and can be taken as the solution resistance plus any other resistance to conduction through the solids. Therefore, the potential drop in Equation 9 for a charging current I is $$v_{separator} + v_R = IR_{ohmic}, \tag{10}$$

and the lower bound for the negative electrode voltage becomes $$v_{C6} = \epsilon_+(q) - (v_{cell} - IR_{ohmic}). \tag{11}$$

This estimate is the basis of a practical implementation of ASCC, which we discuss in the next section. $R_{ohmic}$ itself may be measured without doing a full EIS scan by measuring the real part of the impedance at frequencies high enough to "short-out" $R_{ct}$ via $C_{dl}+D$ in parallel. For these cells, a frequency of 1 kHz is suitable.

Servo Control

In some embodiments, Adaptive Surface Concentration Charging uses a proportional-integral-derivative (PID) controller to servo the estimated lithium surface concentration to a level below saturation by adjusting the battery charger. Charging terminates when the current drops below a given threshold and the cell voltage is close to the target cell voltage.

Instead of servoing surface concentration, the estimated voltage across the graphite electrode, $v_{C6}$ from Equation 11, is servoed to a target voltage, $v_{target}$. Ideally, the target voltage would be 0V at the edge of saturation, where the lithium in graphite is in equilibrium with pure metallic lithium. To be conservative, however, the target voltage is typically set slightly higher, for instance 50 mV, to ensure that a slight overshoot in the servo, charger inaccuracy, or other errors do not cause saturation. The servo input error $\epsilon(t)$ is given by:

$$\epsilon(t) = v_{target} - v_{C6}(t), \tag{12}$$

where the error is updated frequently, such as once per second.

In a multi-cell system where cells are placed in series, the estimated graphite electrode potential is required to be separately calculated for each group of cells in series. Cells in parallel form a single bank, which is effectively a single cell, and cannot be treated separately. To charge conservatively, the most negative error $\epsilon(t)$ of all of the cell banks is servoed to zero.

$$\epsilon_{min}(\epsilon_A, \epsilon_B, \dots) \tag{13}$$

The servo output for the PID controller in this case is the charger voltage, although the charging current could be controlled similarly.

$$V_{charger}(t) = K_P \cdot \epsilon_{min}(t) + K_I \int \epsilon_{min}(t) dt + K_D (d\epsilon_{min}(t)/dt), \tag{14}$$

where $K_P$ is the proportional gain, $K_I$ is the integral gain, and $K_D$ is the derivative gain.

When using a non-zero integral gain $K_I$, special considerations are required for the integral term initialization and prevention of integral wind-up when the output is limited. A logical initial integral term value would be the measured battery pack open circuit voltage $V_{pack}$, so that the charger begins in a state with zero initial charging current. If the charger has a current limit, it is possible for the servo to set a voltage that cannot be achieved. To prevent integral wind-up, the integral term should be suspended if the current is limited by the charger. For systems where it is difficult to know precisely that the charger limit has been reached, the integral term could be resumed if the servo input error were ever negative.

To prevent lithium saturation, the estimated graphite electrode voltage, $v_{C6}$, should always be greater than 0 V; therefore, it is critical that the PID controller gains are tuned to prevent overshoot. Since $v_{C6}$ changes slowly and controller overshoot should be avoided, there is no need to include a derivative term ($K_D=0$). The controller is thus simplified to a proportional-integral (PI) controller.

Charging is terminated when the measured battery pack voltage, $V_{pack}$, is within a threshold, $V_{thresh}$, of the desired charging voltage, $V_{charge}$, and the current drops below a minimum charging current level, $I_{min}$, for a time of at least $t_{termination}$.

Battery Charging Based on Diffusion-Time

Embodiments of the present invention use a measured diffusion time to adaptively control lithium surface concentration to keep this concentration below saturation. An important property governing the dynamics of the surface concentration is diffusion time $\tau$. Many cell characteristics, such as graphite granularity, temperature, and average lithium concentration can affect $\tau$. To follow these changes, the disclosed charging technique makes periodic measurements of $\tau$. In contrast, conventional charging profiles take a one-size-fits-all approach to fixing the charge rate, do not adapt, and must assume the worst-case variability.

Note that measurements of $\tau$ and the cell current are effective aggregate values over all regions of an individual cell. That is the best that can be done given that there are only two electrodes per cell (see FIG. 1). Localized variations that result in current density hot spots or locally slow lithium transport cannot be addressed directly, since we do not have local information to draw upon, only the behavior of the entire cell. Properties that are spatially uniform within a cell are readily handled by this technique. Properties that vary from one region to another within a cell are measured in the aggregate. Hence, what is measured at the electrodes is neither the regional best $\tau$ nor the worst but the average. Similarly, the measured current represents the average current density across the cell. The technique includes a parameter to account for the worst-case regional or spatial variation, which is derived from sampling a representative population of cells. This new charging technique is a major improvement over past schemes in that only worst-case spatial variations within the cell must be characterized rather than attempting to characterize the worst-case cell across the entire population of cells.

Figure 7:
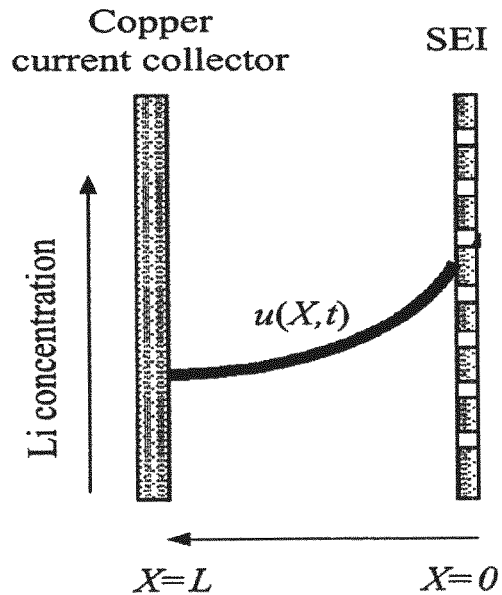
FIG. 7 illustrates a lithium concentration profile.

A diffusion equation governs the transport of lithium into the graphite. (It also arises in the modeling of heat conduction, particle flow, and other phenomena.) More specifically, a schematic representation of lithium transport into the graphite electrode is shown in FIG. 7, which illustrates a lithium concentration profile u(X,t) through the graphite electrode. Note that the SEI is at X=0 and the copper current collector is at some effective distance X=L. The lithium ions diffuse through the electrolyte to the SEI layer, and they are reduced to metallic lithium upon passing through this layer to the graphite, where they diffuse into the graphite electrode and intercalate.

For a uniform slab with uniform boundary conditions, the diffusion equation for the lithium concentration u reduces to one spatial dimension. Expressed in terms of the dimensionless distance x=X/L, it becomes $$\frac{\partial u}{\partial t} - \frac{1}{\tau}\frac{\partial^2 u}{\partial x^2} = 0 \tag{15}$$

The characteristic diffusion time is $\tau = L^2/D$, where D is the diffusivity of lithium in graphite. No lithium leaves the graphite near the copper current collector so the proper boundary condition at x=1 is for the lithium flux density to go to zero. On the other hand, the flux density at the graphite-SEI boundary at x=0 is proportional to the charging current. Each electron reduces one Li$^+$ ion that then diffuses into the graphite and intercalates, so with an appropriate choice of concentration units, the boundary conditions become $$-[\partial u/\partial x]_{x=0} = \frac{I\tau}{Q_{max}} \tag{16}$$

$$[\partial u/\partial x]_{x=1} = 0$$

Here, I is the charging current, and $Q_{max}$ is the capacity of the cell in units of charge. This normalization gives u=1 throughout the graphite for a fully charged cell. Since $Q_{max}$ depends on the open-circuit voltages corresponding to empty and full as well as on the cell design, the choice is arbitrary but convenient. Any initial condition may be handled, but without loss of generality we can start with $$[u]_{t=0} = 0 \tag{17}$$

The solution to this system for a constant current starting at t=0 is $$u(x, t) = \frac{I\tau}{Q_{max}}\left[\frac{t}{\tau} - \frac{1}{6} + \frac{1}{2}(1-x)^2 - \frac{2}{\pi^2}\sum_{k=1}^{\infty}\frac{1}{k^2}e^{-k^2\pi^2 t/\tau}\cos(k\pi x)\right] \tag{18}$$

Figure 8:
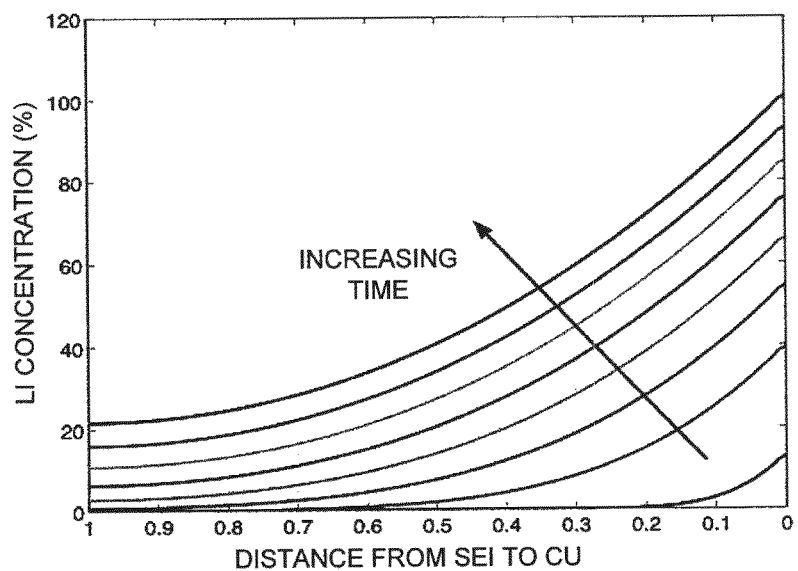
FIG. 8 illustrates the lithium concentration through the graphite in response to a constant current.

FIG. 8 shows how the concentration evolves from early to later times. Eventually, the transient terms decay and leave a uniformly rising parabolic concentration profile. One can also handle the nonzero current at the graphite-SEI interface using zero current boundary conditions but adding a source term that injects lithium just inside the region. In this case, the diffusion equation becomes $$\frac{\partial u}{\partial t} - \frac{1}{\tau}\frac{\partial^2 u}{\partial x^2} = \frac{I(t)}{Q_{max}}\delta(x). \tag{19}$$

The $\delta(x)$ in the source term is a Dirac delta function centered at x=0. This term injects lithium at a normalized rate of $I(t)/Q_{max}$ concentrated here. The solution has the form $$u(x, t) = B_0(t) + 2\sum_{k=1}^{\infty} B_k(t)\cos(k\pi x), \tag{20}$$

where the equations of motion for the coefficients are $$\dot{B}_k + \frac{k^2\pi^2}{\tau}B_k = \frac{I(t)}{Q_{max}}, k = 0, 1, 2, K. \tag{21}$$

The equations of motion are valid even if $\tau$ varies with time, which may be the case if the diffusion coefficient changes with temperature or with overall state of charge. Integration of Equation 21 for a constant $\tau$ and a current step at t=0 gives a solution equivalent to Equation 18, but without the limiting parabolic profile made explicit $$u(x, t) = \frac{I}{Q_{max}}t + \frac{I\tau}{Q_{max}}\frac{2}{\pi^2}\sum_{k=1}^{\infty}\frac{1}{k^2}\left[1 - e^{-k^2\pi^2 t/\tau}\right]\cos(k\pi x). \tag{22}$$

Short Time Behavior from Diffusion in an Infinite Half Space

The response of the concentration near one boundary over times $\Delta t \ll \tau$ is independent of the effects of the opposite boundary, since concentrations near there do not have time to diffuse into the local region. Essentially, only the lithium concentration within a length $l=\sqrt{D\Delta t}$ will have a significant effect. Therefore, the short time response for the concentration near one boundary may be obtained by considering diffusion in a layer where the graphite electrode has no opposite boundary.

Equation 19 still governs diffusion, but now there is only one explicit boundary condition, namely for zero current on the single boundary. The solution in this case has the form $$u(x, t) = 2\int_0^{\infty} B(k, t)\cos(kx)\frac{dk}{2\pi} \tag{23}$$

This is the continuum analog of Equation 20. Substitution into Equation 19 and representing the source term in the same basis gives the equations of motion for the coefficients $$\frac{\partial B(k, t)}{\partial t} + \frac{k^2}{\tau}B(k, t) = \frac{I(t)}{Q_{max}}. \tag{24}$$

For zero concentration initial condition and a constant current starting at t=0, the solution is $$B(k,t) = \frac{I\tau}{Q_{max}} \frac{1-e^{-k^2 t/\tau}}{k^2} \Rightarrow u(x,t) = \tag{25}$$

$$\frac{I\tau}{Q_{max}}\left[\left(\text{erf}\left(\frac{1}{2}\sqrt{\frac{\tau}{t}}x\right)-1\right)x + 2\sqrt{\frac{t}{\pi\tau}}e^{-\frac{1}{2}\frac{x^2}{2t/\tau}}\right]$$

Here, $$\text{erf}(x) = \frac{2}{\sqrt{\pi}}\int_0^x e^{-y^2}\,dy$$

is the so-called error function, which tends to 1 for large x. The concentration near the interface after the step is $$u(x,t) = 2\frac{I}{Q_{max}}\sqrt{\frac{\tau}{\pi}}\sqrt{t} - \frac{I\tau}{Q_{max}}x + O(x^2). \tag{26}$$

Here, $O(x^2)$ means additional terms of order $x^2$ and higher. As expected, the concentration gradient corresponds exactly to the source current. If the current is interrupted, the concentration will relax, and the solution of Equation 24 with this first order profile as the initial condition gives the concentration near the interface after the interruption as $$u(x,t) = u_0 - 2\frac{I}{Q_{max}}\sqrt{\frac{\tau}{\pi}}\sqrt{t} + O(x^2) \tag{27}$$

Here, $u_0$ is the surface concentration just before the interruption in the current.

Measuring Cell Diffusion Times

Equations 26 and 27 are the basis of a class of methods for measuring the diffusion time $\tau$ from current step or pulse relaxation that are known in the field collectively as "galvanostatic intermittent titration techniques" (GITT). This section develops and explains one practical method.

The lithium concentration in the graphite $u(x,t)$ can be estimated using Equation 20 and Equation 21 by knowing the measured current I, the cell capacity $Q_{max}$ and $\tau$. The diffusion time $\tau$ can be estimated, according to Equation 27, by calculating the relaxation of the lithium surface concentration a short time after a current interruption. For Equation 27 to be useful, however, what is needed is the relationship between the relaxation in surface concentration and the measured cell voltage.

Since charge must flow in an external circuit to do the work to transfer a lithium atom from the positive electrode to the negative electrode, this work is observable as an electromotive force (EMF). Under relaxed, zero current conditions, the voltage measured across the cell equals the cell's EMF.

The work done for a reversible process under conditions of constant temperature and pressure is given by the change in the Gibb's free energy:

$$dG = -\sum_i \mu_i dN_i. \tag{28}$$

Here, the work done is written in terms of the chemical potentials $\mu_i$ and numbers $N_i$ of species i in the system. (Conceptually, the absolute chemical potential is the work required to remove one unit of a species from the system and place it an infinite distance away.) For the lithium ion cell, the work done to transfer one lithium atom is $$\Delta G = -(\mu_{Li,C_6} - \mu_{Li,CoO_2}) \tag{29}$$

where $\mu_{Li,C_6}$ and $\mu_{Li,CoO_2}$ are the chemical potentials for the lithium in the graphite and in the cobalt dioxide, respectively. One electron of charge moves through the external circuit in this process, so the EMF is given by $$E = \frac{\Delta G}{q_e} = \frac{\mu_{Li,CoO_2} - \mu_{Li,C_6}}{q_e} \tag{30}$$

where $q_e$ is the elementary electronic charge. This can be expressed in terms of the electrochemical potentials $\epsilon_{Li,C_6}$ and $\epsilon Li,CoO_2$ for the respective half-cell reactions

as $$E = \epsilon_{Li,CoO_2} - \epsilon_{Li,C_6}. \tag{33}$$

The electrochemical potentials depend on the lithium concentrations in the respective electrodes, lithium ion concentrations nearby in the electrolyte, and so on. Practical cell formulations may incorporate additional substances into the electrode materials that modify the chemistry somewhat, but the principles are the same. Taking diffusion of lithium into the graphite to be the rate-determining process, all other concentrations are treated as equilibrated. For example, the distribution of ions in the electrolyte and of lithium in the cobalt dioxide is assumed to be uniform. Consequently, the positive electrode electrochemical potential $\epsilon_{Li,CoO_2}$ depends on the average concentration of lithium in the cobalt dioxide, which is simply related to the state of charge q, which does not change during the current interruption. The state of charge q is defined as the fraction of remaining cell capacity ranging from empty (q=0%) to full (q=100%).

On the other hand, for the lithium in the graphite the electrochemical potential $\epsilon_{Li,C_6}$ depends on the slowly changing lithium surface concentration. If the cell is given sufficient time to rest, approximately half of the diffusion time or $\tau/2$, the distribution of lithium in the graphite becomes uniform and the lithium surface concentration, with suitable normalization, equals the state of charge q.

Figure 9:
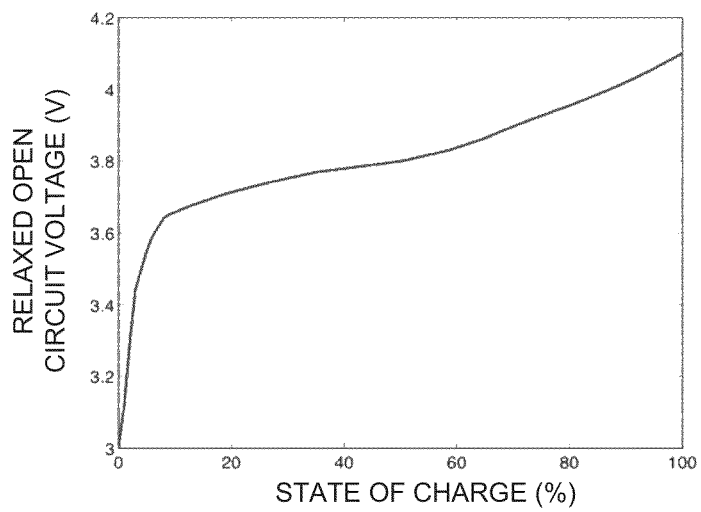
FIG. 9 illustrates a relaxed open-circuit voltage for a lithium-ion cell versus the state of charge in accordance with an embodiment of the present invention.

FIG. 9 shows the relaxed cell voltage (blue) as a function of the state of charge. This voltage is calculated from the electrochemical potentials for the positive $\epsilon_{Li,CoO_2}$ (red) and negative $\epsilon_{Li,C_6}$ (green) electrodes with respect to a lithium metal reference electrode (often referred to as the "Li/Li+" electrode in the field). The cell open-circuit voltage after relaxation $V_{OC,relax}$ is simply given by the difference between the positive and negative electrochemical potentials:

$$V_{OC,relax}(q) = \epsilon_{Li,CoO_2}(q) - \epsilon_{Li,C_6}(q). \tag{34}$$

The electrochemical potentials are fundamental properties of the chemistry of the cell; hence, the curves in FIG. 9 apply to all cells constructed with the same materials. The electrochemical potentials, $\epsilon_{Li,CoO_2}$ and $\epsilon_{Li,C_6}$ also depend upon the absolute temperature T according to the Nernst equation:

$$\varepsilon = \varepsilon^\circ - \frac{k_B T}{n q_e} \ln Q, \qquad (35)$$

where $\epsilon^\circ$ is the standard electrode potential for all reactants and products in their reference states, $k_B$ is the Boltzmann constant, n is the number of electrons transferred in the half-reaction (n=1 for this reaction), and Q is the reaction quotient. (Note that Q is the product of the relative activities of the products and reactants, each raised to a power appropriate to the stoichiometry for the reaction; it is 1 for all materials in their reference states.)

Figure 10:
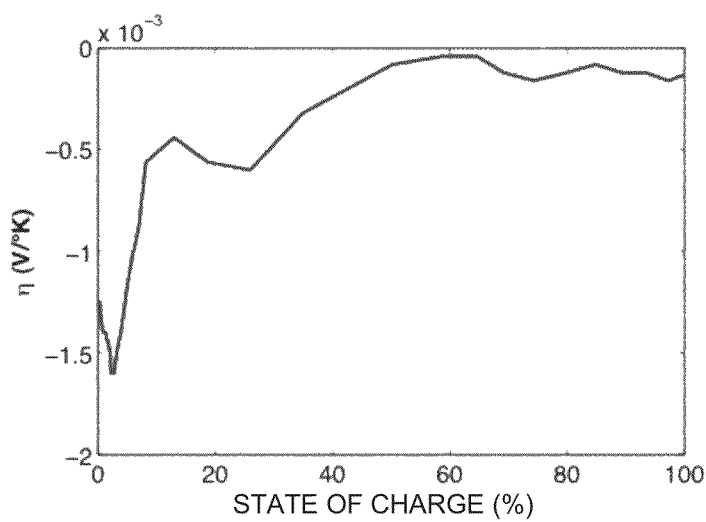
FIG. 10 illustrates a temperature correction factor as a function of a state of charge in accordance with an embodiment of the present invention.

Neglecting any small temperature dependence in Q, the Nernst equation can be recast as a linear temperature correction to the voltage that depends only on the relevant concentration, such as the state of charge q(t) for the positive electrode and the lithium surface concentration u(0,t) for the negative electrode. The temperature correction factor $\eta$ is determined from measurements of the electrochemical potentials taken at 15° C., 25° C., 35° C., and 45° C. FIG. 10 shows the temperature correction factors $\eta$ for the positive and negative electrode potentials taking $T_0$=25° C. as the reference point. At any other temperature, the corrected potential is $$\epsilon(q,T) = \epsilon(q,T_0) + \eta(q) \cdot (T - T_0). \qquad (36)$$

The open-circuit voltage, $V_{OC}$, when not fully relaxed, can now be related to the lithium concentrations and temperature by $$V_{OC}(t,T) = \epsilon_{Li,CoO_2}(q,T) - \epsilon_{Li,C_6}(v(t),T), \qquad (37)$$

designating v(t) as the lithium concentration at the surface of the graphite as determined by the cell voltage. Measurement of the relaxation of the open circuit voltage $V_{OC}$(t,T) after a current interruption can now be used to estimate the lithium surface concentration v(t) by using Equations 36 and 37 with the parameterized data in FIG. 9, which characterizes $\epsilon_{Li,C_6}$(q,$T_0$) and $\epsilon_{Li,CoO_2}$(q,$T_0$), and the parameterized data in FIG. 10, which characterizes $\eta_{Li,C_6}$ and $\eta_{Li,CoO_2}$. The estimate of the lithium surface concentration v(t) from the relaxation of the open circuit voltage $V_{OC}$(t,T) can be used with the derivative of Equation 27 to calculate $\tau$:

$$\frac{dv(t)}{d\sqrt{t}} = -2 \frac{I}{Q_{max}} \sqrt{\frac{\tau}{\pi}}, \qquad (38)$$

where I is the constant current that was interrupted.

Several different dynamic processes occur in a cell with nonzero current, one of which is the slow diffusion examined here. The others act over much shorter time scales (less than one second), and their net effect to a constant current is to contribute a resistive-like potential drop IR. When the constant current is interrupted in order to use Equation 38 to measure $\tau$, this potential drop disappears, leaving the slow relaxation of the open circuit voltage $V_{OC}$(t,T), given by Equation 37.

Figure 11:
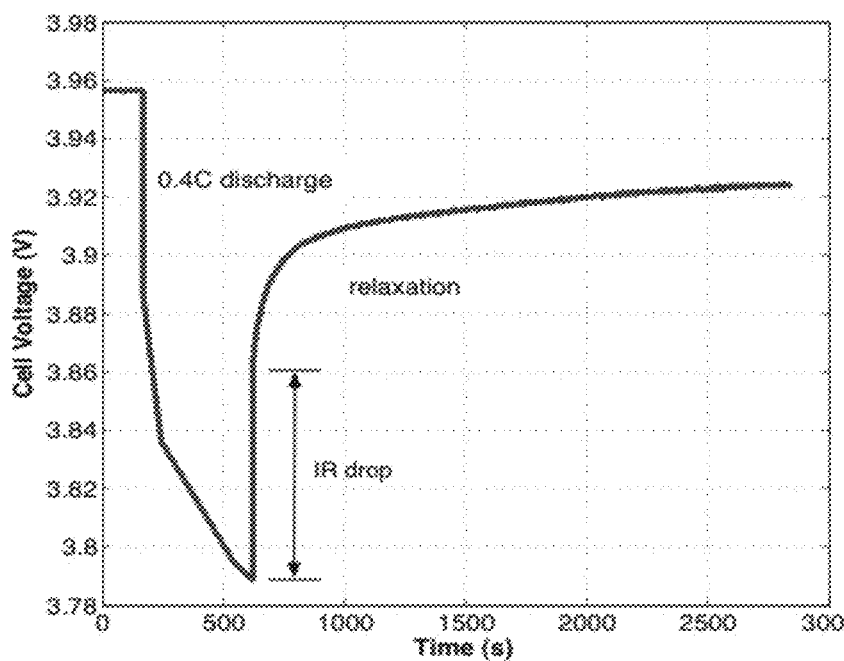
FIG. 11 illustrates sample data for cell voltage versus time for a pulse discharge in accordance with an embodiment of the present invention.

FIG. 11 shows the cell voltage versus time for a 7.5 minute, 0.4 C discharge (about 1.0 A for this cell) followed by one hour of relaxation. In far less than a second after the discharge is stopped, a resistive drop of about 70 mV disappears and the long relaxation from the changing lithium surface concentration is seen.

Figure 12:
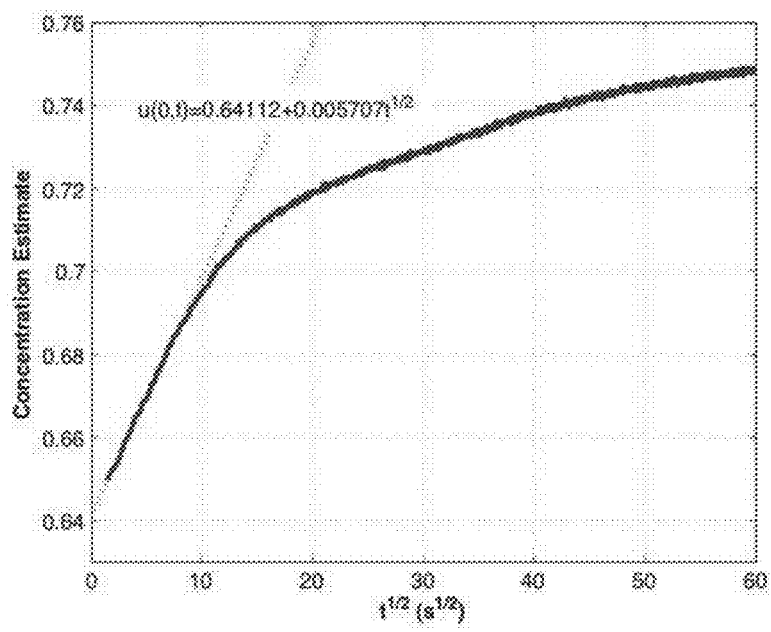
FIG. 12 illustrates relaxation after a current discharge pulse in accordance with an embodiment of the present invention.

Equation 38 indicates that the lithium surface concentration v(t) should be linear with respect to the square root of time for short time periods with a slope given by the square root of the diffusion time $\tau$. FIG. 12 shows a plot of the estimated lithium surface concentration v(t) obtained from the relaxation of the open circuit voltage after a constant current interruption versus the square root of time as measured from the end of the discharge pulse. The behavior for short times is linear as predicted, and the diffusion time obtained from the slope is ≈2070 s. Qualitative deviations from the square root of time behavior are seen in a plot of the full analytic solution for the surface concentration for t≥0.02$\tau$, so based on the data shown in FIG. 12, the real diffusion time may be greater than 3200 s.

Figure 13:
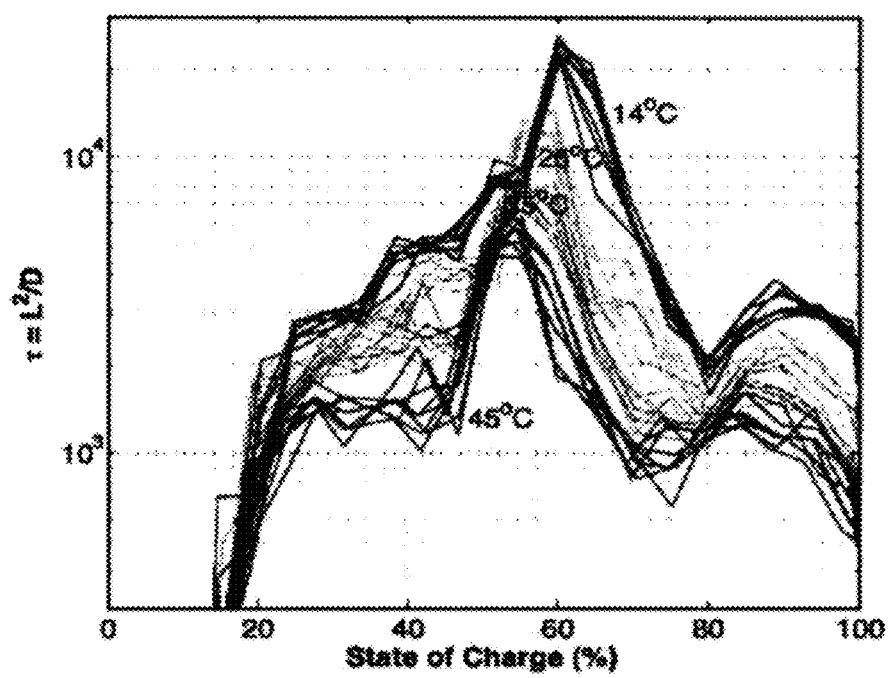
FIG. 13 illustrates diffusion times derived from relaxation after discharge in accordance with an embodiment of the present invention.

We measured $\tau$ versus state of charge for twenty cells at 15° C., 25° C., 35° C., and 45° C. The results are presented in FIG. 13. The diffusion time varies as expected with temperature, namely diffusion is slower for the cold cells than for the warm ones. There is also a consistent peak in the diffusion time in an intermediate range of the state of charge, which suggests that this is the condition where the lithium surface concentration may saturate when charging.

Ideal Charging

The ideal charging technique brings the lithium surface concentration to 100% and holds it there until the lithium concentration throughout all of the graphite is also 100%, indicating a fully charged cell. To find the charging current, the diffusion equation, Equation 15, is solved with the boundary conditions being that the surface (x=0) concentration is 100% and that no lithium leaves the graphite near the copper current collector (x=1)

$$[u]_{x=0} = 1$$

$$[\partial u / \partial x]_{x=1} = 0. \qquad (39)$$

Applying the initial condition $[u]_{t=0}$=0, the solution to the diffusion equation is given by, $$u(x,t) = 1 + 2 \sum_{k=1}^{\infty} B_k(t) \sin\left[\left(k - \frac{1}{2}\right)\pi x\right], \qquad (40)$$

where $$B_k(t) = \frac{-1}{\pi\left(k - \frac{1}{2}\right)} e^{-\left(k - \frac{1}{2}\right)^2 \pi^2 t/\tau}. \qquad (41)$$

The ideal charging current is obtained by applying to the solution the relationship between the slope of the concentration at the surface and the current $$-[\partial u/\partial x]_{x=0} = \frac{I\tau}{Q_{max}}. \qquad (42)$$

By taking the derivative of Equation 38 with respect to x at x=0 and substituting in Equation 42, the solution to the ideal charging current is $$I_{ideal}(t) = 2 \frac{Q_{max}}{\tau} \sum_{k=1}^{\infty} e^{-\left(k - \frac{1}{2}\right)^2 \pi^2 t/\tau}. \qquad (43)$$

For short times $\Delta t \ll \tau$ and short distances $l = \sqrt{D\Delta t} \ll L$, the presence of the opposite boundary can again be neglected, allowing for the solution to the diffusion equation in an infinite half-space. The solution has the form similar to Equation 40, but continuous as expected $$u(x, t) = 1 + 2\int_0^\infty B(k, t) \sin(kx) \frac{dk}{2\pi}. \quad (44)$$

Substituting into the diffusion equation, Equation 15, and applying the initial condition $[u]_{t=0} = 0$ yields $$u(x, t) = 1 - \text{erf}\left[\frac{1}{2} \frac{x}{\sqrt{t/\tau}}\right], \quad (45)$$

where again $$\text{erf}(x) = \frac{2}{\sqrt{\pi}} \int_0^x e^{-y^2} dy.$$

Using the relation given in Equation 42, the ideal short time charging current is then $$I_{ideal}(t) = \frac{Q_{max}}{\sqrt{\pi\tau}} \frac{1}{\sqrt{t}}. \quad (46)$$

Any practical application of a current of this form would use the average required current over some time interval, $\Delta t$ $$\langle I_{ideal}\rangle_{\Delta t} = 2\frac{Q_{max}}{\sqrt{\pi\tau}} \frac{1}{\sqrt{\Delta t}}. \quad (47)$$

Note that the long time behavior of the ideal charging current is governed by the k=1 term of Equation 43, where the current decays exponentially with a time constant of $4\tau/\pi^2$ or about $0.4\tau$. The short time behavior is given by Equation 46, in which the current decays as the square root of time.

Figure 14:
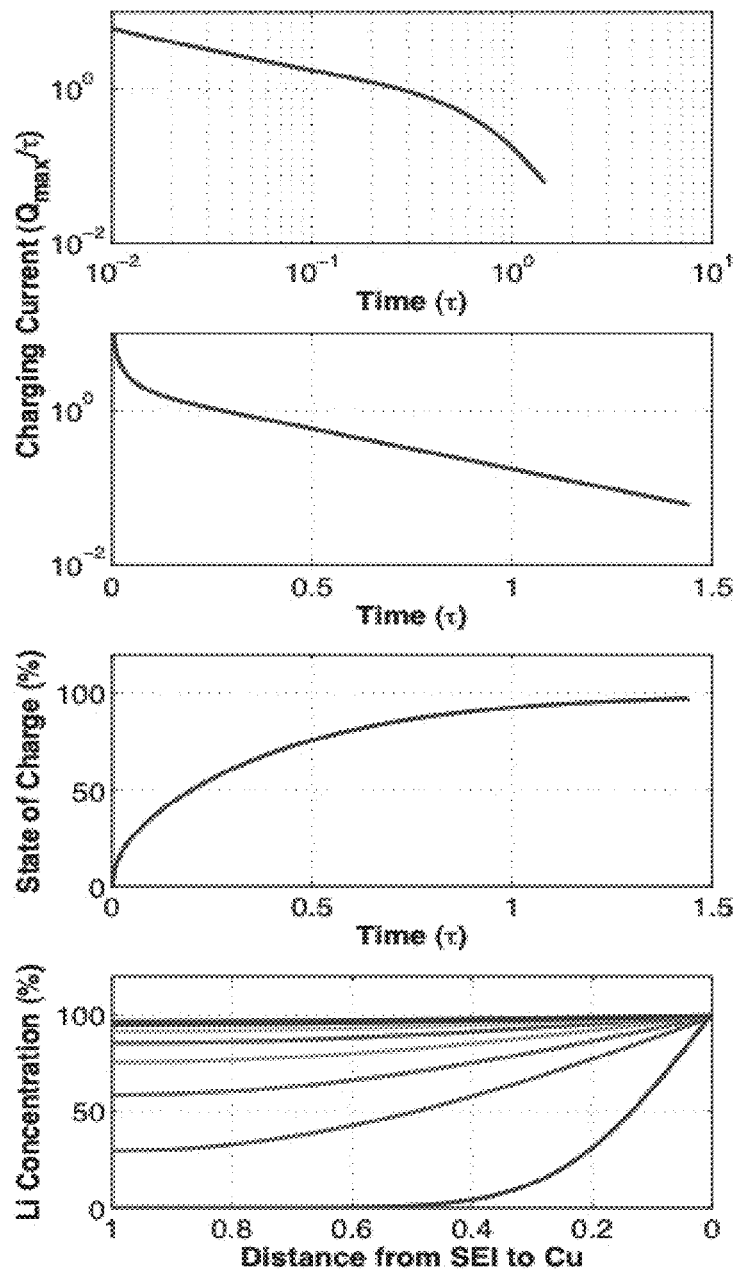
FIG. 14 illustrates ideal charging with a constant diffusion time in accordance with an embodiment of the present invention.

FIG. 14 shows a simulation of ideal charging with a constant diffusion time $\tau$. The top two plots show the charging current versus time: the top plot is on a log-log scale, while the second plot is on a log-linear scale. The top plot illustrates the dependence of the charging current on the square root of time for times less than about $0.2\tau$. The second plot shows the exponential behavior of the charging current for times greater than about $0.4\tau$. Note that the transition from square root time behavior to exponential behavior for the charging current occurs between $0.2\tau$ and $0.4\tau$. The third plot in FIG. 14 shows the state of charge versus time in units of the diffusion time $\tau$, indicating that under ideal conditions, a cell can be fully charged in about $1.5\tau$. The final plot shows the lithium concentration as a function of the distance across the graphite from the SEI for eight equally spaced times during charging. Notice how the boundary condition of 100% lithium concentration at the surface, Equation 39, is maintained throughout the ideal charge.

Figure 15:
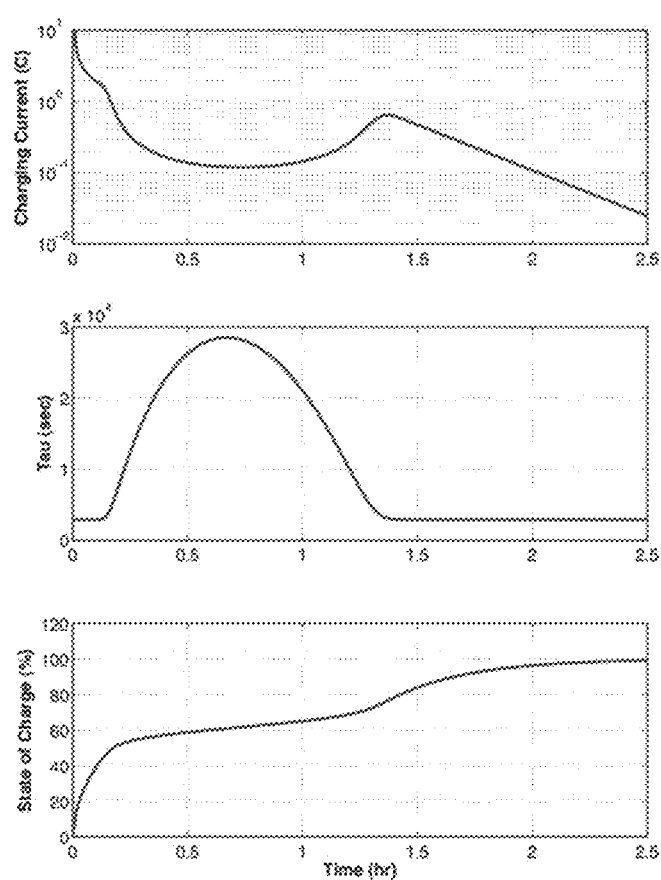
FIG. 15 illustrates ideal charging with a varying diffusion time in accordance with an embodiment of the present invention.

In a real system $\tau$ is not constant and depends upon the state of charge, the temperature, and other cell characteristics. FIG. 15 shows the ideal charging profile with an always known, but changing, $\tau$. More specifically, FIG. 15 shows the charging current, $\tau$, and the state of charge as a function of time. The $\tau$ used in the simulation comes from a parameterization of the diffusion time data in FIG. 13 for a slower than typical cell at 14° C. Notice that the ideal charge tends to vary inversely with the diffusion time, slowing considerably, in this example, at a state of charge between 50% and 70%, where $\tau$ reaches nearly 30000 seconds. Notice also that above a state of charge of 70% at about 1.2 hours, the charging current increases as 2 decreases. This simulation indicates how a charging technique that takes advantage of the diffusion time to maintain the lithium surface concentration at or below 100% can charge a cell very quickly (2.5 hours) even in a worst case scenario (slow cell at 14° C.).

Diffusion-Limited Adaptive Charging

An ideal adaptive charging technique adjusts the charging current to maintain the lithium surface concentration at 100%, but assumes that $\tau$ is known at all times. In contrast, Diffusion-Limited Adaptive Charging is a practical charging technique that calculates the lithium surface concentration based upon periodic measurements of $\tau$ and calculates a charging current that keeps the lithium surface concentration at or below 100%, preventing graphite saturation at the separator interface. The optimal charging current $I_{opt}$ that maintains the lithium surface concentration at 100% is given by Equation 27. We apply the results of the infinite half-space problem for an iteration time, $t_{n+1}-t_n$, which is significantly faster than $\tau$:

$$I_{opt}(t_{n+1}) = 2\frac{Q_{max}}{\sqrt{\pi\tau}} \frac{(1 - u_{I=0}(0, t_{n+1}))}{\sqrt{t_{n+1} - t_n}}. \quad (48)$$

$u_{I=0}(0, t_{n+1})$ is the lithium surface concentration calculated from the diffusion model with the current shut off (I=0) for the next iteration time. Equation 48 gives the current required to compensate for the relaxation that would occur with zero current.

The zero current lithium surface concentration $u_{I=0}(0, t_{n+1})$ is estimated from Equations 20 and 21. Equation 20 gives the surface concentration from the diffusion model from a set of evolving coefficients $B_k(t)$:

$$u(0, t_n) = B_0(t_n) + 2\sum_{k=1}^\infty B_k(t_n). \quad (49)$$

Looking one time iteration ahead with zero current, it is the same relationship with coefficients $B_{k,I=0}(t)$ that have been evolved one step with zero current:

$$u_{I=0}(0, t_{n+1}) = B_{0,I=0}(t_{n+1}) + 2\sum_{k=1}^\infty B_{k,I=0}(t_{n+1}). \quad (50)$$

The evolution of the coefficients $B_k(t)$ in Equation 21 can be calculated in an iterative and stable fashion by using the forward difference (or implicit difference) to approximate the derivative of $B_k(t)$:

$$BY_k'(t_n) = \frac{B_k(t_n) - B_k(t_{n-1})}{t_n - t_{n-1}}. \quad (51)$$

Using the forward difference calculation, the $B_k$ coefficients are accurate for time steps given by:

$$(t_n - t_{n-1}) < \frac{\tau}{k^2\pi^2}. \tag{52}$$

Note that for a time step of 1 second and a minimum diffusion time of 3200 seconds, only the first 18 $B_k$ terms are accurate. In contrast, for a τ of 50000 seconds, the first 71 $B_k$ terms are accurate. The benefit of using the forward difference is that, although the estimates may be inaccurate, the higher order terms go toward zero always producing a stable net result. Also, the higher order terms (even if inaccurate) are often insignificant and can be ignored without any significant error on the overall estimation.

Substituting Equation 51 into Equation 21, one can solve for $B_k(t_n)$ based on the measured current I normalized to total capacity $Q_{max}$, the diffusion time τ, and the previous value of $B_k(t_{n-1})$:

$$B_k(t_n) = \frac{B_k(t_{n-1}) + (t_n - t_{n-1})\frac{I(t_n)}{Q_{max}}}{1 + (t_n - t_{n-1})\frac{k^2\pi^2}{\tau}}. \tag{53}$$

To calculate the predicted lithium surface concentration, assuming zero current for the next iteration, simply calculate the next iteration $B_{k,I=0}(t_{n+1})$ assuming a future current $I(t_{n+1})$ of zero:

$$B_{k,I=0}(t_{n+1}) = \frac{B_k(t_n)}{1 + (t_{n+1} - t_n)\frac{k^2\pi^2}{\tau}}. \tag{54}$$

Equation 48 may now be used to calculate the optimal charging current $I_{opt}$ assuming that the diffusion time τ is known.

Since τ varies with temperature, state of charge, and other cell variations (see FIG. 13), always knowing the diffusion time accurately is problematic. In Diffusion-Limited Adaptive Charging, τ is re-measured frequently, such as every few minutes, using the voltage relaxation technique described earlier, since the cell temperature or state of charge cannot change significantly in such short periods. By measuring the diffusion time frequently, corrections to the diffusion time based on changes to the temperature or state of charge are unnecessary.

To measure the diffusion time of a cell, the charging current is set to zero periodically to measure the relaxation of the open circuit voltage. The open-circuit voltage $V_{OC}$, state of charge q, and measured temperature T can be used to estimate the lithium surface concentration v(t) using Equation 37 for two times following the current interruption (t1 and t2). These two estimates of the lithium surface concentration v(t1) and v(t2) are combined with Equation 38 to determine the diffusion time:

$$\tau = \pi \left[\frac{v(t2) - v(t1)}{\sqrt{t2} - \sqrt{t1}} \frac{Q_{max}}{2I}\right]^2 \tag{55}$$

Equation 38 is valid for a relaxation period $t_{rest}$ that follows a constant current period $t_{cc}$ at least as long as the relaxation time. Also, Equation 38 is valid only for a relaxation time $t_{rest}$ much shorter than τ. Specifically, for a fixed relaxation time $t_{rest}$, the measured τ is valid only if it is larger than the relaxation time divided by about 0.02. To be conservative during charging, the diffusion time $\tau_m$ is equal to the minimum of the measured τ and the minimum accurate diffusion time for the fixed relaxation time.

$$\tau_m = \min\left(\tau, \frac{t_r}{0.02}\right) \tag{56}$$

For example, with a 64 second relaxation time, the current before relaxation should be constant for at least 64 seconds, and diffusion times less than about 3200 seconds cannot be accurately measured. The cell voltages $V_{OC}(t1)$ and $V_{OC}(t2)$ needed to measure τ could be measured at t1=4 seconds and t2=$t_{rest}$=64 seconds. By reducing the relaxation time, one increases the ability to measure smaller diffusion times, but the smaller relaxation time places higher requirements on the cell voltage precision, as the voltage relaxation is smaller for a shorter relaxation period.

Since τ depends upon temperature T and state of charge q, which change during charging, the diffusion time should be measured often. The period of time between diffusion time measurements $t_p$ is sum of the time the optimal charging current is applied $t_{opt}$, the relaxation time $t_{rest}$, and the constant current time $t_{cc}$:

$$t_p = t_{opt} + t_{rest} + t_{cc}. \tag{57}$$

To account for the possibility of a changing τ between the periodic measurements or inaccuracies in using the cell voltage to measure τ, the diffusion time can be arbitrarily increased by a conservative factor α. The larger this conservative factor α, the more slowly the cell will charge, because it is charged as if its diffusion time was longer than actually measured.

The conservative factor α must also account for the worst-case non-uniformity in cells arising, for instance, from current density hot spots or locally slow diffusion times. For instance, if the current density in one local spot of the cell is 50% higher than the average current density, the conservative factor α would need to be at least 2.25, since τ varies as the current squared, as seen in Equation 55.

The conservative factor α is required to be greater than 1 with a typical value of 2, and can be optimized for any specific implementation or worst-case current or diffusion time non-uniformity.

$$\tau_c = \alpha \cdot \tau_{min}. \tag{58}$$

In calculating the projected, zero current surface concentration $u_{I=0}(0,t_{n+1})$ and the optimal charging current $I_{opt}$, the conservative $\tau_c$ should be used instead of τ in Equations 48, 53 and 54.

If charging always began with a rested cell at zero state of charge and a known diffusion time $\tau_c$, then the $B_k$ terms could simply be initialized to zero at the start of charge, and evolved from the initial state using a measured $\tau_c$ and current I. Often, however, the distribution of lithium in the graphite u(x,t) and the diffusion time $\tau_c$ are unknown at the start of charging. Even if $\tau_c$ was known, u(x,t) cannot be accurately calculated over long periods of time due to the random walk nature of integrating the current I(t) that has a white noise component. This is the same problem that occurs with coulomb counting to determine the state of charge q(t), where the uncertainty grows as the square root of time.

In order to initialize the $B_k$ parameters at the start of charge, the lithium distribution needs to be in a known state and $\tau_c$ must be measured. Diffusion-Limited Adaptive Charging addresses this problem by charging the cell at a low constant current h for a sufficient period of time $t_{init}$, such as charging with 0.1 C for 5 minutes, so that the distribution of lithium in the graphite can be described by the parabolic distribution given in Equation 18. After the constant initialization current, the current is set to zero and the cell is allowed to relax for $t_{rest}$ seconds, and the first measurement of diffusion time $\tau_{c0}$ can be measured using Equation 58.

Using Equation 20 and Equation 22, one can solve for the $B_k$ terms at the surface (x=0) for a constant charging current $I_0$ for a time $t_o$ with a diffusion time of $\tau_{c0}$.

$$B_0(t_0) = \frac{I_0 t_{init}}{Q_{max}} = q \quad (59)$$

$$B_k(t_{init}) = \frac{I_0 \tau_{c0}}{Q_{max} k^2 \pi^2}\left[1 - e^{-k^2\pi^2 t_{init}/\tau_{c0}}\right] k \geq 1 \quad (60)$$

Note that $B_0(t)$, i.e. when k=0, is the integral of the current I normalized to $Q_{max}$, which is simply equal to the state of charge q.

Equation 59 and Equation 60 describe the $B_k$ terms at the end of the constant current $I_0$ charge, but not at the end of the initial relaxation period. Since the current is zero during the $\tau_{c0}$ measurement period, $B_0(t_{init})$ is equal to $B_0(t_{init}+t_{rest})$, which is the state of charge q. To determine the other $B_k$ terms at the end of the initial relaxation period $t_{init}+t_{rest}$, Equation 60 is iterated using Equation 54, resulting in:

$$B_k(t_{init}+t_{rest}) = \frac{I_0 \tau_{c0}}{Q_{max}k^2\pi^2} \frac{\left[1 - e^{-k^2\pi^2 t_{init}/\tau_{c0}}\right]}{\left[1 + (t_{n+1}-t_n)\frac{k^2\pi^2}{\tau_{c0}}\right]^{\frac{t_{rest}}{(t_{n+1}-t_n)}}}, \quad (61)$$

$$k \geq 1$$

After initializing the $B_k$ terms at the end of the initial calibration charge using Equation 59 and Equation 61, the $B_k$ terms can thereafter be iteratively updated using Equation 53 with the measured current I, and the most recent diffusion time $\tau_c$.

During each time iteration, the optimal charging current $I_{opt}(t_{n+1})$ is calculated, but not always used. For instance, there may be a maximum charging limit imposed by the charger, or a thermal limit, or a quantization of the charger's current set-point. Also, in order to periodically measure the diffusion time $\tau_c$, the current is required to be constant for a period $t_{cc}$, and zero for a relaxation period $t_{rest}$, as discussed for Equation 55. Even when the optimal charging current from Equation 48 is ignored for the above reasons, the $B_k$ terms continue to be accurate, since they are updated using the measured charging current $I(t_n)$, regardless of the optimal charging current $I_{opt}(t_n)$.

Figure 16:
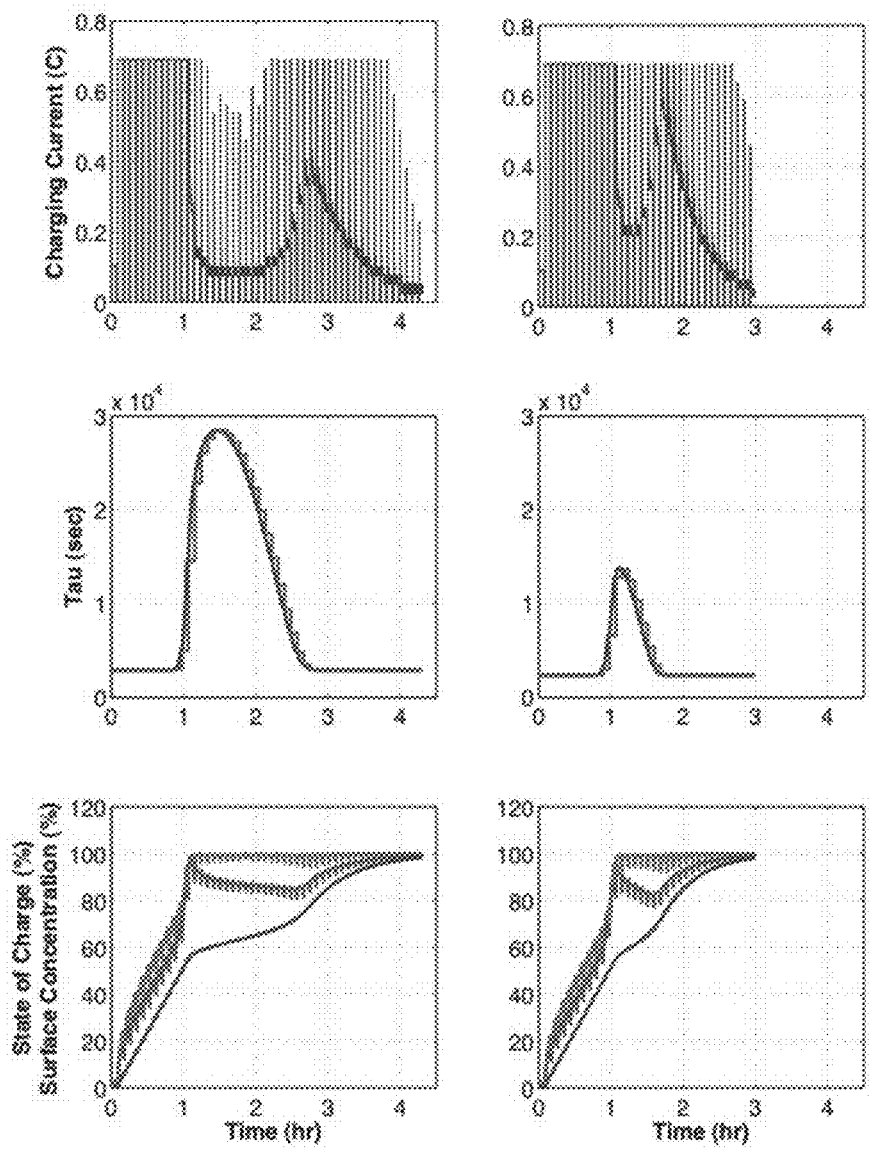
FIG. 16 illustrates simulation results for charging a cell using diffusion-limited adaptive charging in accordance with an embodiment of the present invention.

A simulation of charging a battery with Diffusion-Limited Adaptive Charging is illustrated in FIG. 16. The charging current I(t), lithium surface concentration u(0,t), and state of charge q(t) were simulated by using a parameterization of the diffusion time $\tau$ from the data shown in FIG. 13 as a function of temperature T and state of charge q. To account for variation in diffusion times between cells, the parameterized diffusion time $\tau$ is adjusted by ±20% to characterize slow (+20%), typical (+0%), and fast (−20%) cells.

The charging begins with an initialization current $I_0/Q_{max}$ of 0.1 C for $t_0$=256 seconds, followed by the first diffusion time measurement $\tau_m$ after a relaxation of $t_r$=64 seconds. A conservative factor $\alpha$ of 1.8 is used according to Equation 58 to obtain a conservative diffusion time $\tau_c$. After the initialization current, the $B_k$ terms are initialized using Equation 59 and Equation 61 for k from 0 to 10, while the higher order k terms are ignored.

Thereafter, the $B_k$ terms are updated iteratively every $t_n - t_{n-1}$=1 second using Equation 53, and an optimal charging current is calculated using Equation 48. The normalized optimal current $I_{opt}/Q_{max}$ is limited to 0.7 C to simulate a maximum charging limit $I_{max}$, and quantized to 128 mA to simulate the quantization of a charger's current set-point. For the first 192 seconds after a relaxation period, the charger is set to the optimal current $I_{opt}(t_{n+1})$. For the next 64 seconds, the current is held constant before the relaxation period $t_r$, which also lasts for 64 seconds. At the end of each relaxation period, the diffusion time $\tau_c$ is measured. This cycle repeats until the cell is charged.

FIG. 16 shows simulation results from charging a cell at two different temperatures: 14° C. on the left and 25° C. on the right. The top plots in the figure show the charging current $I/Q_{max}$ as a function of time, where the periodic resting periods to measure $\tau_c$ can be seen followed by current surges. The current surges following a rest period arise naturally with the technique to make up for the decrease in lithium surface concentration during the rest period, when the lithium surface concentration has time to relax. The middle plots show the true diffusion time $\tau$ (blue) as well as the diffusion time measured at the end of each relaxation period (green). The plot on the bottom shows the state of charge q (blue), the lithium surface concentration estimator (red) using the sampled diffusion rate $\tau$ increased by the conservative factor $\alpha$, and the true lithium surface concentration (green) using the true diffusion rate $\tau$. The simulation shows that the estimated time to charge a cell at 14° C. is about 4 hours, while a cell at 25° C. charges in less than 3 hours.

Battery Design

Figure 17:
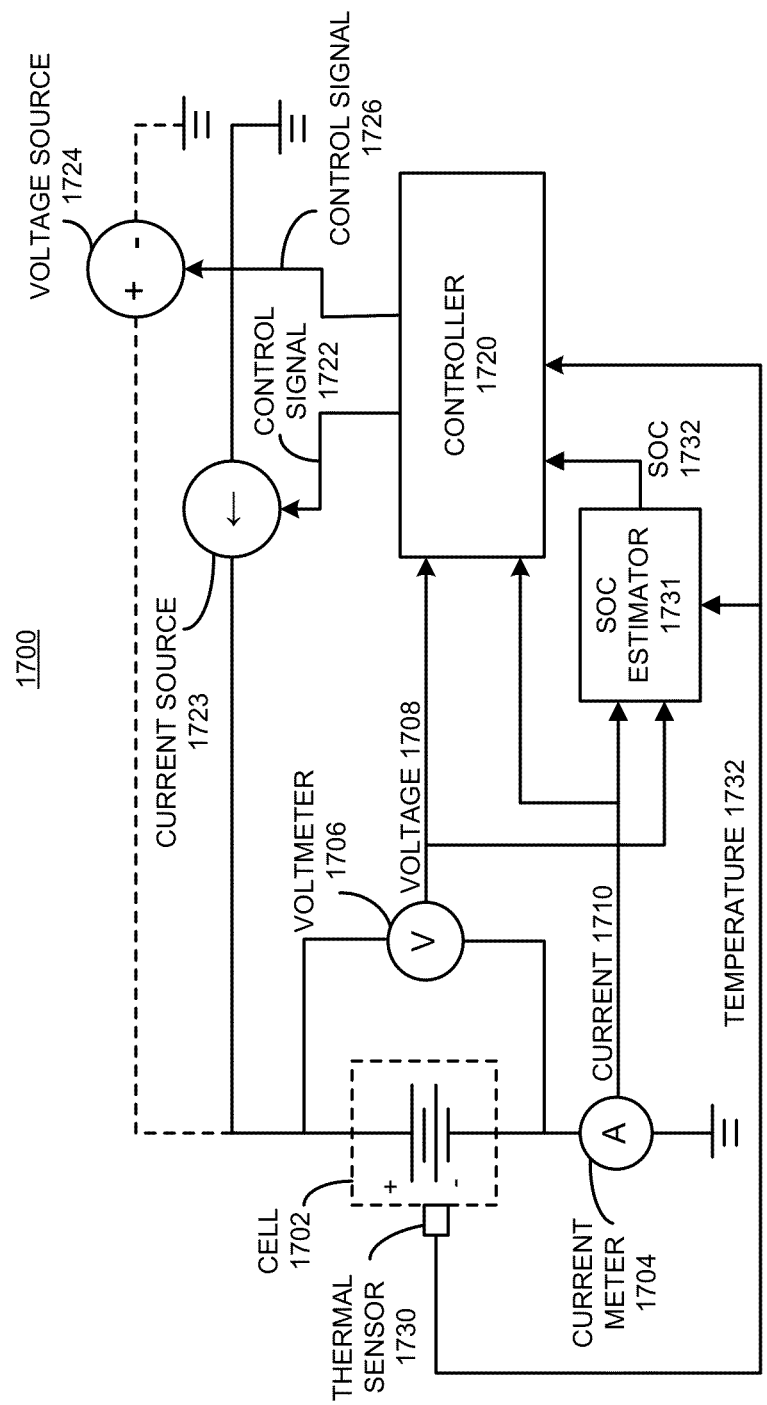
FIG. 17 illustrates a rechargeable battery that supports adaptive charging in accordance with an embodiment of the present invention.

FIG. 17 illustrates a rechargeable battery 1700 that supports adaptive charging in accordance with an embodiment of the present invention. Battery 1700 includes a battery cell 1702, which is illustrated in more detail in FIG. 1. It also includes a current meter (current sensor) 1704, which measures a charging current applied to cell 1702, and a voltmeter (voltage sensor) 1706, which measures a voltage across cell 1702. Battery 1700 also includes a thermal sensor 1730, which measures the temperature of battery cell 1702. (Note that numerous possible designs for current meters, voltmeters and thermal sensors are well-known in the art.)

Rechargeable battery 1700 also includes a current source 1723, which provides a controllable constant charging current (with a varying voltage), or alternatively, a voltage source 1724, which provides a controllable constant charging voltage (with a varying current).

The charging process is controlled by a controller 1720, which receives: a voltage signal 1708 from voltmeter 1706, a current signal 1710 from current meter 1704 a temperature signal 1732 from thermal sensor 1730 and a state of charge (SOC) value 1732 from SOC estimator 1730. These inputs are used to generate a control signal 1722 for current source 1723, or alternatively, a control signal 1726 for voltage source 1724.

During operation, SOC 1732 estimator receives a voltage 1708 from voltmeters 1706, a current from current meter 1704 and a temperature from thermal sensor 1730 and outputs a state of charge value 1732. (The operation of SOC estimator 1730 is described in more detail below.)

Note that controller 1720 can be implemented using either a combination of hardware and software or purely hardware. In one embodiment, controller 1720 is implemented using a microcontroller, which includes a microprocessor that executes instructions which control the charging process.

The operation of controller 1720 during the charging process is described in more detail below.

Charging Process

Figure 18:
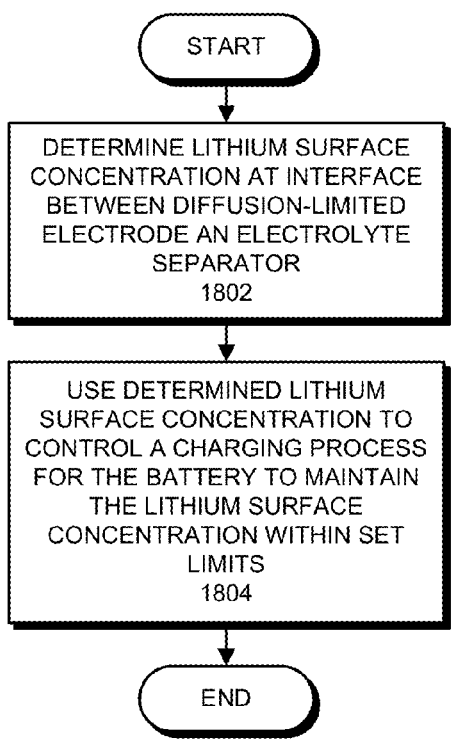
FIG. 18 presents a flow chart illustrating the charging process in accordance with an embodiment of the present invention.

FIG. 18 presents a flow chart illustrating the charging process in accordance with an embodiment of the present invention. At a high level, the system first determines a lithium surface concentration at an interface between the transport-limiting electrode and the electrolyte separator (step 1802). Next, the system uses the determined lithium surface concentration to control a charging process for the battery so that the charging process maintains the lithium surface concentration within set limits (1804).

Figure 19:
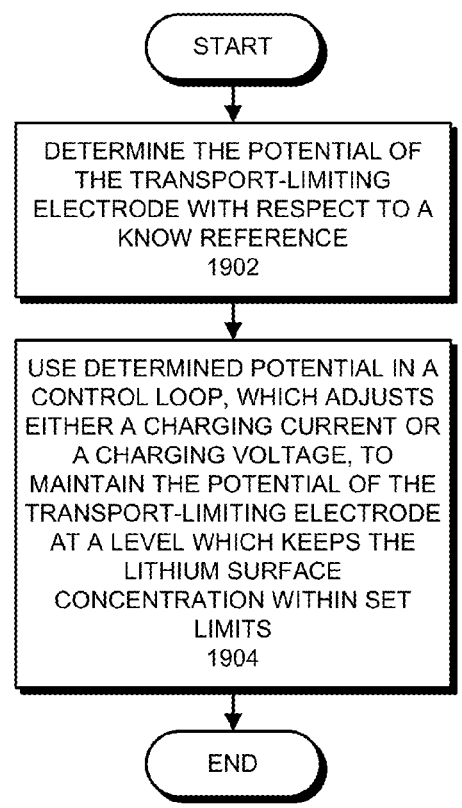
FIG. 19 presents another flow chart illustrating the charging process in accordance with an embodiment of the present invention.

In a more specific embodiment, referring to FIG. 19, the system first determines a potential of the transport-limiting electrode with respect to a known reference, wherein the potential is correlated with the lithium surface concentration (step 1902). Next, the system uses the determined potential of the transport-limiting electrode in a control loop, which adjusts either a charging voltage or a charging current, to maintain the potential of the transport-limiting electrode at a level which keeps the lithium surface concentration within set limits (step 1904).

Determining the Potential of the Transport-limiting Electrode

Figure 20:
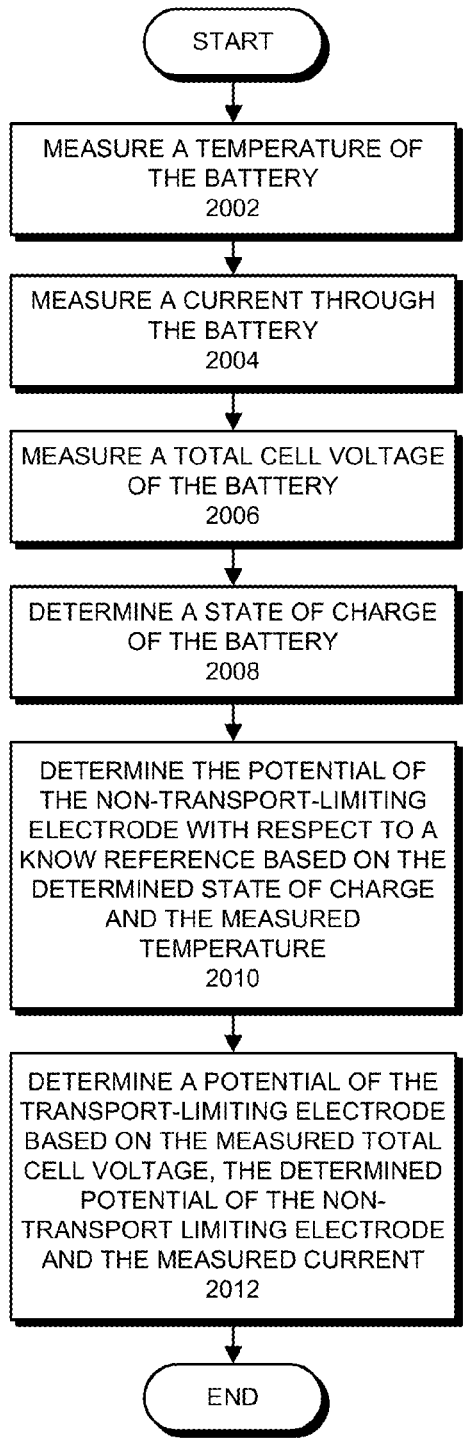
FIG. 20 presents a flow chart illustrating the process of determining a voltage across a transport-limiting electrode in accordance with an embodiment of the present invention.

FIG. 20 presents a flow chart illustrating the process of determining a potential of a transport-limiting electrode with respect to a known reference in accordance with an embodiment of the present invention. In this embodiment, the system measures the temperature of the battery through a thermal sensor (step 2002). The system also measures a current through the battery (step 2004) and a total cell voltage of the battery (between the electrodes) (step 2006).

The system also determines a state of charge of the battery (step 2008). In one embodiment of the present invention, this involves reading the state of charge from a "gas gauge integrated circuit," such as part number bq27000 distributed by Texas Instruments of Dallas, Tex. These gas gauge circuits generally operate by determining a state of charge of the battery from a previous state of charge of the battery in addition to a measured current, a measured temperature and a measured total cell voltage of the battery.

Next, the system determines the potential of the non-transport-limiting electrode (generally the positive electrode) from the determined state of charge and the temperature (step 2010). Finally, the system determines the potential of the transport-limiting electrode (generally the negative electrode) by starting with the measured total cell voltage and subtracting the determined potential of the non-transport-limiting electrode, and also subtracting a voltage drop caused by the measured current multiplied by a resistance through the battery (step 2012).

Charging Process Based on Diffusion Time

Figure 21:
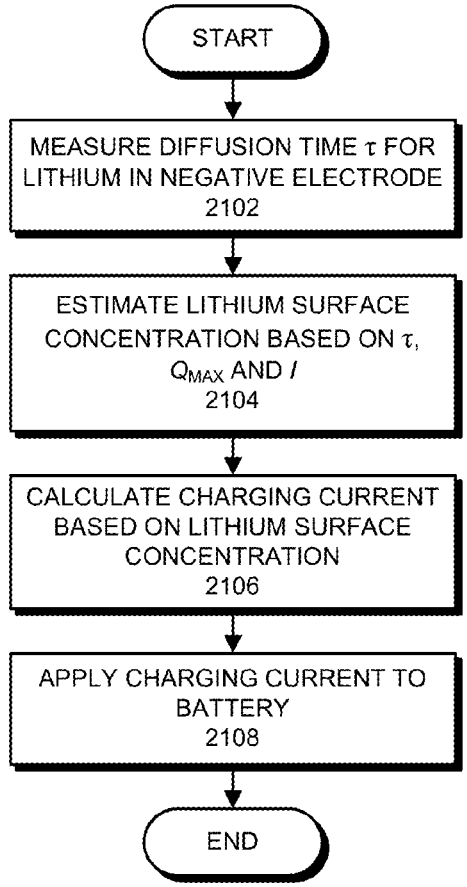
FIG. 21 presents a flow chart illustrating a charging process based on measuring the diffusion time $\tau$ in accordance with an embodiment of the present invention.

FIG. 21 presents a flow chart illustrating a charging process based on measuring the diffusion time τ for a transport-limiting electrode governed by diffusion in accordance with an embodiment of the present invention. In this embodiment, the system first measures a diffusion time τ for lithium in the negative electrode (step 2102). (This can involve using a process which is described in more detail below with reference to FIG. 22.) Next, the system estimates the lithium surface concentration based on the diffusion time τ, a cell capacity $Q_{max}$ for the battery and a measured charging current I for the battery (step 2104).

In one embodiment, the system measures τ periodically, and this measured value for τ is used to model how the surface concentration evolves between τ measurements based on the charging current I and the cell capacity $Q_{max}$. For example, τ can be measured every few minutes, and this measured τ value can be used in a model for the surface concentration, which is updated every second between τ measurements.

Next, the system calculates a charging current or a charging voltage for the battery based on the estimated lithium surface concentration (step 2106), which can involve performing the calculation in Equation 48. Next, the system applies the calculated charging current or charging voltage to the battery, for example through current source 1723 or voltage source 1724 (step 2108).

Process of Measuring Diffusion Time

Figure 22:
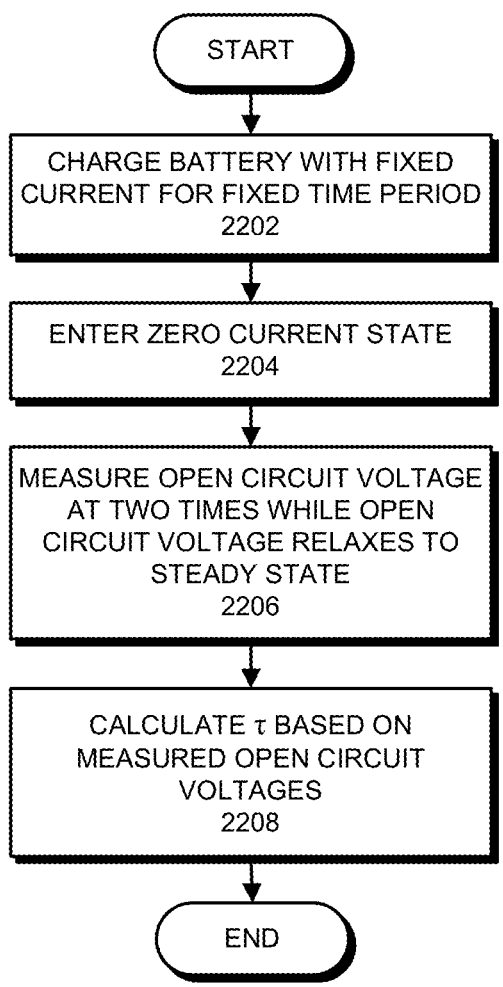
FIG. 22 presents a flow chart illustrating the process of measuring the diffusion time $\tau$ in accordance with an embodiment of the present invention.

FIG. 22 presents a flow chart illustrating the process of measuring the diffusion time τ in accordance with an embodiment of the present invention. During this process, the system first charges the battery with a fixed current for a fixed time period (step 2202). Next, the system enters a zero current state in which the charging current is set to zero (step 2204). During this zero current state, the system measures an open circuit voltage for the battery at two times while the open circuit voltage relaxes toward a steady state (step 2206). Finally, the system calculates the diffusion time τ based on the measured open circuit voltages (step 2208), for example, using Equations 37 and 55.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for adaptively charging a battery, wherein the battery is a lithium-ion battery that includes a transport-limiting electrode governed by diffusion, an electrolyte separator and a non-transport-limiting electrode, comprising while the battery is charging:
- charging the battery with a fixed current for a fixed time period;
- entering a zero current state in which the charging current is set to zero;
- during the zero current state, measuring an open circuit voltage for the battery at two times while the open circuit voltage relaxes toward a steady state; and
- calculating a charging current or a charging voltage based on the measured open circuit voltages; and
- applying the calculated charging current or the calculated charging voltage to the battery.

2. The method of claim 1, wherein calculating the charging current or the charging voltage based on the measured open circuit voltages includes:
- calculating a diffusion time T based on the measured open circuit voltages;
- calculating a lithium surface concentration based on the diffusion time T, a state of charge of the battery q and a temperature of the battery T; and
- calculating the charging current or the charging voltage for the battery based on the calculated lithium surface concentration.

3. The method of claim 1,
- wherein the transport-limiting electrode is a negative electrode; and
- wherein the non-transport-limiting electrode is a positive electrode.

4. The method of claim 3,
wherein the negative electrode is comprised of graphite and/or $TiS_2$;
wherein the electrolyte separator is a liquid electrolyte comprised of $LiPF_6$, $LiBF_4$ and/or $LiClO_4$ and an organic solvent; and
wherein the positive electrode is comprised of $LiCoO_2$, $LiMnO_2$, $LiFePO_4$ and/or $Li_2FePO_4F$.

5. A lithium-ion battery with an adaptive charging mechanism, comprising:
a transport-limiting electrode governed by diffusion;
an electrolyte separator;
a non-transport-limiting electrode;
a current sensor configured to measure a charging current for the battery;
a voltage sensor configured to measure a voltage across terminals of the battery;
a charging source configured to apply a charging current or a charging voltage to the battery;
a controller configured to receive inputs from the current sensor and the voltage sensor, and configured to send a control signal to the charging source;
wherein, while the battery is charging, the controller is configured to:
charge the battery with a fixed current for a fixed time period,
enter a zero current state in which the charging current is set to zero,
during the zero current state, measure an open circuit voltage for the battery at two times while the open circuit voltage relaxes toward a steady state, and
calculate a charging current or a charging voltage based on the measured open circuit voltages, and
apply the charging current or the charging voltage to the battery.

6. The lithium-ion battery of claim 5, wherein while calculating the charging current or the charging voltage, the controller is configured to:
calculate a diffusion time $\tau$ based on the measured open circuit voltages;
calculate a lithium surface concentration based on the diffusion time $\tau$, a state of charge of the battery q and a temperature of the battery T; and
calculate the charging current or the charging voltage for the battery based on the calculated lithium surface concentration.

7. The lithium-ion battery of claim 5,
wherein the transport-limiting electrode is a negative electrode; and
wherein the non-transport-limiting electrode is a positive electrode.

8. The lithium-ion battery of claim 7,
wherein the negative is comprised of graphite and/or $TiS_2$;
wherein the electrolyte separator is a liquid electrolyte comprised of $LiPF_6$, $LiBF_4$ and/or $LiClO_4$ and an organic solvent; and
wherein the positive electrode is comprised of $LiCoO_2$, $LiMnO_2$, $LiFePO_4$ and/or $Li_2FePO_4F$.

9. A non-transitory computer-readable storage medium storing instructions that when executed by a controller for a battery cause the controller to perform a method for adaptively charging a battery, wherein the battery is a lithium-ion battery which includes a transport-limiting electrode governed by diffusion, an electrolyte separator and a non-transport-limiting electrode, the method comprising, while the battery is charging:

charging the battery with a fixed current for a fixed time period;
entering a zero current state in which the charging current is set to zero;
during the zero current state, measuring an open circuit voltage for the battery at two times while the open circuit voltage relaxes toward a steady state; and
calculating a charging current or a charging voltage based on the measured open circuit voltages; and
applying the charging current or the charging voltage to the battery.

10. The non-transitory computer-readable storage medium of claim 9, wherein calculating the charging current or the charging voltage based on the measured open circuit voltages includes:
calculating a diffusion time $\tau$ based on the measured open circuit voltages;
calculating a lithium surface concentration based on the diffusion time $\tau$, a state of charge of the battery q and a temperature of the battery T; and
calculating the charging current or the charging voltage for the battery based on the calculated lithium surface concentration.

11. A method for adaptively charging a battery, wherein the battery is a lithium-ion battery which includes a transport-limiting electrode governed by diffusion, an electrolyte separator and a non-transport-limiting electrode, comprising:
determining a lithium surface concentration at an interface between the transport-limiting electrode and the electrolyte separator based on a diffusion time for lithium in the transport-limiting electrode;
calculating a charging current or a charging voltage for the battery based on the determined lithium surface concentration; and
applying the charging current or the charging voltage to the battery.

12. The method of claim 11, wherein the charging current or charging voltage is calculated to maintain the lithium surface concentration within set limits.

13. The method of claim 11, wherein calculating the charging current or charging voltage involves maximizing the charging current or charging voltage while maintaining the lithium surface concentration within the set limits.

14. The method of claim 11, wherein determining the lithium surface concentration involves:
measuring a diffusion time $\tau$ for lithium in the transport-limiting electrode; and
estimating the lithium surface concentration between $\tau$ measurements based on the diffusion time $\tau$, a cell capacity $Q_{max}$ for the battery and a measured charging current I for the battery.

15. The method of claim 14, wherein measuring the diffusion time $\tau$ involves periodically:
charging the battery with a fixed current for a fixed time period;
entering a zero current state in which the charging current is set to zero;
during the zero current state, measuring an open circuit voltage for the battery at two times while the open circuit voltage relaxes toward a steady state; and
calculating the diffusion time $\tau$ based on the measured open circuit voltages.

16. The method of claim 15,
wherein the transport-limiting electrode is a negative electrode; and
wherein the non-transport-limiting electrode is a positive electrode.

17. The method of claim 16,
wherein the negative electrode is comprised of graphite and/or $TiS_2$;
wherein the electrolyte separator is a liquid electrolyte comprised of $LiPF_6$, $LiBF_4$ and/or $LiClO_4$ and an organic solvent; and
wherein the positive electrode is comprised of $LiCoO_2$, $LiMnO_2$, $LiFePO_4$ and/or $Li_2FePO_4F$.

* * * * *